(12) United States Patent
Hu et al.

(10) Patent No.: US 11,790,392 B2
(45) Date of Patent: Oct. 17, 2023

(54) SYSTEMS AND METHODS FOR ELECTRIC VEHICLE CHARGING

(71) Applicant: BEIJING DIDI INFINITY TECHNOLOGY AND DEVELOPMENT CO., LTD., Beijing (CN)

(72) Inventors: Yu Hu, Beijing (CN); Ren Ren, Beijing (CN); Junjun Zhang, Beijing (CN); Ziyan Sun, Beijing (CN); Ke En, Beijing (CN); Le Ding, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 566 days.

(21) Appl. No.: 16/888,727

(22) Filed: May 30, 2020

(65) Prior Publication Data
US 2020/0294078 A1    Sep. 17, 2020

Related U.S. Application Data

(63) Continuation of application No. PCT/CN2018/097382, filed on Jul. 27, 2018.

(30) Foreign Application Priority Data

Nov. 30, 2017   (CN) .......................... 201711240909.4
Nov. 30, 2017   (CN) .......................... 201711242974.0

(51) Int. Cl.
G06Q 30/0207        (2023.01)
B60L 53/62          (2019.01)
(Continued)

(52) U.S. Cl.
CPC ........ *G06Q 30/0237* (2013.01); *B60L 53/305* (2019.02); *B60L 53/62* (2019.02);
(Continued)

(58) Field of Classification Search
CPC ..................... G06Q 30/0237; G06Q 30/0631; B60L 53/62; B60L 53/305
(Continued)

(56) References Cited

U.S. PATENT DOCUMENTS 8,610,401 B2   12/2013  Kim et al.
9,201,407 B2   12/2015  Baxter et al.
(Continued)

FOREIGN PATENT DOCUMENTS

CN       102832670 A       12/2012
CN       104599120 A        5/2015
(Continued)

OTHER PUBLICATIONS

The Extended European Search Report in European Application No. 18883944.3 dated Sep. 15, 2020, 9 pages.
(Continued)

*Primary Examiner* — Richard V Muralidar
(74) *Attorney, Agent, or Firm* — METIS IP LLC

(57) ABSTRACT

The present disclosure relates to a system and a method for electric vehicle charging. The system may perform the method to: receive a request for charging station recommendation from a client terminal; determine at least one charging station within a preset distance range of the client terminal; determine an evaluation for each of the at least one charging station based on one or more evaluation parameters; and transmitting, by the first computing device, the evaluation of the each of the at least one charging station and an identifier of the each of the at least one charging station to the client terminal.

18 Claims, 16 Drawing Sheets

(51) Int. Cl.
  *B60L 53/30* (2019.01)
  *B60L 53/66* (2019.01)
  *G06Q 30/0601* (2023.01)
(52) U.S. Cl.
  CPC ........ *B60L 53/665* (2019.02); *G06Q 30/0631* (2013.01); *G06Q 30/0639* (2013.01)
(58) Field of Classification Search
  USPC ........................................................ 320/109
  See application file for complete search history.

(56) References Cited

U.S. PATENT DOCUMENTS

| | | | |
|---|---|---|---|
| 2011/0074350 | A1 | 3/2011 | Kocher |
| 2012/0233077 | A1 | 9/2012 | Tate, Jr. et al. |
| 2013/0110296 | A1* | 5/2013 | Khoo ................. G06Q 10/1093 700/286 |
| 2014/0316939 | A1* | 10/2014 | Uyeki ....................... B60L 3/12 705/26.9 |
| 2014/0347018 | A1 | 11/2014 | Boblett et al. |
| 2017/0168493 | A1 | 6/2017 | Miller et al. |
| 2017/0276503 | A1 | 9/2017 | Oh et al. |
| 2019/0275892 | A1* | 9/2019 | Williams ................ B60L 53/35 |

FOREIGN PATENT DOCUMENTS

| | | |
|---|---|---|
| CN | 104778263 A | 7/2015 |
| CN | 104933466 A | 9/2015 |
| CN | 105048537 A | 11/2015 |
| CN | 105575000 A | 5/2016 |
| CN | 105857097 A | 8/2016 |
| CN | 106864289 A | 6/2017 |
| CN | 107133841 A | 9/2017 |
| JP | 2008309544 A | 12/2008 |
| JP | 2011034500 A | 2/2011 |
| JP | 2012026768 A | 2/2012 |
| JP | 2013153604 A | 8/2013 |

OTHER PUBLICATIONS

The Second Office Action in Chinese Application No. 201711240909.4 dated Dec. 21, 2020, 32 pages.
Jiang, Jiuchun et al., Functions of Charging Station Monitoring System, Electric Vehicle Charging Technology and System, 2017, 6 pages.
Notice of Reasons for Rejection in Japanese Application No. 2020529730 dated Jun. 22, 2021, 9 pages.
First Office Action in Chinese Application No. 201711240909.4 dated Apr. 29, 2020, 27 pages.
First Office Action in Chinese Application No. 201711242974.0 dated Jun. 3, 2020, 18 pages.
International Search Report in PCT/CN2018/097382 dated Nov. 1, 2018, 5 pages.
Written Opinion in PCT/CN2018/097382 dated Nov. 1, 2018, 4 pages.

* cited by examiner

1300

```
┌─────────────────────────────────────────────────────┐
│ Receiving a charging prompt and an associating prompt│ ~ 1310
│ from a charging pile after the charging pile is      │
│ connected to an electric vehicle associated with a   │
│ client terminal                                      │
└─────────────────────────────────────────────────────┘
                          ↓
┌─────────────────────────────────────────────────────┐
│ Causing a user interaction interface of the client   │ ~ 1320
│ terminal to display the charging prompt and/or the   │
│ associating prompt                                   │
└─────────────────────────────────────────────────────┘
                          ↓
┌─────────────────────────────────────────────────────┐
│ Generating a charging request for charging the       │ ~ 1330
│ electric vehicle based on a user interaction on the  │
│ user interface                                       │
└─────────────────────────────────────────────────────┘
                          ↓
┌─────────────────────────────────────────────────────┐
│ Generating an associating request for connecting the │ ~ 1340
│ client terminal with a charging management device    │
│ based on the associating prompt                      │
└─────────────────────────────────────────────────────┘
                          ↓
┌─────────────────────────────────────────────────────┐
│ Sending the charging request and the associating     │ ~ 1350
│ request to the charging pile                         │
└─────────────────────────────────────────────────────┘
```

FIG. 13

SYSTEMS AND METHODS FOR ELECTRIC VEHICLE CHARGING

CROSS-REFERENCE TO RELATED APPLICATIONS

This application is a continuation of International Application No. PCT/CN2018/097382, filed on Jul. 27, 2018, which claims priority to Chinese Patent Application No. 201711240909.4 filed on Nov. 30, 2017, and Chinese Patent Application No. 201711242974.0 filed on Nov. 30, 2017, the contents of which are incorporated herein by reference in their entirety.

TECHNICAL FIELD

The present disclosure generally relates to systems and methods for online to offline services, and in particular, systems and methods for electric vehicle charging.

BACKGROUND

With the popularity of new energy vehicles such as the electric cars or the hybrid cars, more and more charging stations are provided to charge the new energy vehicles. By distributing a wide range of charging piles, the driver of the new energy vehicle may locate a charging pile for charging more efficiently, and the convenience of travel may be improved. Meanwhile, the Internet-based online to offline services, such as online taxi-calling services, have become increasingly popular because of their convenience. In addition to the traditional gasoline cars, the electric cars or the hybrid cars also become part of the transportation means of the Internet-based online to offline services. A user may obtain one or more charging stations using an application implemented on a client terminal (e.g., a mobile phone). In general, a server associated with the application may recommend the charging stations based on information such as the number of charging piles of a charging station and/or user preference. Such information of a charging station may not be up-to-date, which causes a bad user experience. Further, to facilitate charging and payment, the user of the electric car may need to communicate with the charging pile and a server via his/her mobile phone. In the process of establishing communication, the user may perform multiple association operations, such as initiating an association request, checking associating information, etc., which may affect the user experience. Therefore, it would be desirable to provide systems and methods to charge electric vehicles more efficiently.

SUMMARY

According to an aspect of the present disclosure, a method is provided. The method may be implemented on at least one device each of which has at least one processor, a storage, and a communication platform to connect to a network. The method may include one or more of the following operations. The at least one processor may receive a request for charging station recommendation from a client terminal. The at least one processor may determine at least one charging station within a preset distance range of the client terminal. The at least one processor may determine an evaluation for each of the at least one charging station based on one or more evaluation parameters. The one or more evaluation parameters include at least one of: a price discount provided by the each of the at least one charging station, a distance between the each of the at least one charging station and the client terminal, a preset recommendation value for the each of the at least one charging station, or a historical evaluation of the each of the at least one charging station. The at least one processor may transmit the evaluation of the each of the at least one charging station and an identifier of the each of the at least one charging station to the client terminal.

In some embodiments, to determine an evaluation for each of the at least one charging station, the at least one processor may obtain one or more preset weight values corresponding to the one or more evaluation parameters, respectively. The at least one processor may estimate a weighted sum of the one or more evaluation parameters based on the one or more preset weight values. The at least one processor may designate the weighted sum of the one or more evaluation parameters as the evaluation of the each of the at least one charging station.

In some embodiments, the one or more preset weight values may include at least one of: a first preset weight value corresponding to the price discount provided by the each of the at least one charging station being 40%, a second preset weight value corresponding to the distance between the each of the at least one charging station and the client terminal being 35%, a third preset weight value corresponding to the preset recommendation value of the each of the at least one charging station being 20%, or the fourth preset weight value corresponding to the historical evaluation value of the each of the at least one charging station being 5%.

In some embodiments, the at least one processor may further for each of the at least one charging station, determine the preset recommendation value based on one or more recommendation parameters. The one or more recommendation parameters include at least one of: a number of charging piles at the each of the at least one charging station, a real-time parking fee at the each of the at least one charging station, or a unit charging price associated with the each of the at least one charging station.

In some embodiments, to determine the preset recommendation value, the at least one processor may obtain one or more preset percentages corresponding to one of the one or more recommendation parameters, respectively. The at least one processor may determine the preset recommendation value based on the one or more preset percentages, wherein the preset recommendation value is equal to a sum of the one or more recommendation parameters multiplying the corresponding preset percentage, respectively.

In some embodiments, the one or more preset percentages may include at least one of: a first preset percentage corresponding to the number of charging piles at the each of the charging station being 45%, a second preset percentage corresponding to the real-time parking fee at the each of the at least one charging station being 35%, or a third preset percentage corresponding to the charging unit price associated with the each of the at least one charging station being 20%.

In some embodiments, to transmit the evaluation of each of the at least one charging station and an identifier of each of the at least one charging station to the client terminal, the at least one processor may sorting the at least one charging station in a descending order according to the evaluation of the at least one charging station. The at least one processor may send the evaluation of each of the sorted at least one charging station and the identifier of each of the sorted at least one charging station to the client terminal for display.

In some embodiments, to transmit the evaluation of each of the at least one charging station and an identifier of each of the at least one charging station to the client terminal, the at least one processor may determine whether the evaluation of the each of the at least one charging station is greater than or equal to a preset threshold. The at least one processor may send the identifier of the each of the at least one charging station to the client terminal for display in response to a determination that the evaluation is greater than or equal to the preset threshold.

In some embodiments, the at least one processor may further receive a charging request and an associating request for connecting the client terminal and the second computing device from a target charging pile at one of the at least one charging station. The at least one processor may determine charging information for charging an electric vehicle associated with the client terminal based on the charging request. The at least one processor may establish a connection between the second computing device and the client terminal based on the associating request. The at least one processor may send the charging information to the target charging pile for charging the electric vehicle based on the charging information.

In some embodiments, the at least one processor may further obtain a current charging status of the electric vehicle from the target charging pile. The at least one processor may send the current charging status to the client terminal through the connection between the client terminal and the second computing device.

In some embodiments, the at least one processor may further determine whether the charging for the electric vehicle is completed. The at least one processor may determine a charging fee corresponding to the charging information in response to a determination that the charging for the electric vehicle is completed. The at least one processor may send the charging fee to the client terminal. The at least one processor may deduct the charging fee from an electronic financial account associated with the client terminal upon receiving a payment confirmation for the charging fee from the client terminal.

According to another aspect of the present disclosure, a method is provided. The method may be implemented on at least one device each of which has at least one processor, a storage, and a communication platform to connect to a network. The method may include one or more of the following operations. The at least one processor may receive a charging request and an associating request for connecting a client terminal and the charging management device from a charging pile. The at least one processor may determine charging information for charging an electric vehicle associated with the client terminal based on the charging request. The at least one processor may establish a connection between the charging management device and the client terminal based on the associating request. The at least one processor may send the charging information to the charging pile for charging the electric vehicle based on the charging information.

In some embodiments, the at least one processor may further obtain a current charging status of the electric vehicle from the target charging pile. The at least one processor may send the current charging status to the client terminal through the connection between the client terminal and the charging management device.

In some embodiments, the at least one processor may further determine whether the charging for the electric vehicle is completed. The at least one processor may determine a charging fee corresponding to the charging information in response to a determination that the charging for the electric vehicle is completed. The at least one processor may send the charging fee to the client terminal. The at least one processor may deduct the charging fee from an electronic financial account associated with the client terminal upon receiving a payment confirmation for the charging fee from the client terminal.

According to another aspect of the present disclosure, a method is provided. The method may be implemented on at least one device each of which has at least one processor, a storage, and a communication platform to connect to a network. The method may include one or more of the following operations. The at least one processor may determine whether the charging pile is connected with an electric vehicle. The at least one processor may determine a client terminal associated with the electric vehicle in response to a determination that the charging pile is connected with the electric vehicle. The at least one processor may send a charging prompt and an associating prompt to the client terminal. The at least one processor may receive a charging request for charging the electric vehicle at the charging pile and an associating request for connecting the client terminal with a charging management device from the client terminal. The at least one processor may send the charging request and the associating request to the charging management device via the data exchange port.

In some embodiments, the at least one processor may further receive the charging information from the charging management device. The at least one processor may operate the charging pile to charge the electric vehicle based on the charging information.

In some embodiments, the at least one processor may further send current charging status of the electric vehicle to the charging management device.

According to another aspect of the present disclosure, a method is provided. The method may be implemented on at least one device each of which has at least one processor, a storage, and a communication platform to connect to a network. The method may include one or more of the following operations. The at least one processor may receive a charging prompt and an associating prompt from a charging pile via the data exchange port after the charging pile is connected to an electric vehicle associated with the client terminal. The at least one processor may cause a user interface of the client terminal to display the charging prompt. The at least one processor may generate a charging request for charging the electric vehicle based on a user interaction on the user interface. The at least one processor may generate an associating request for connecting the client terminal with a charging management device based on the associating prompt. The at least one processor may send the charging request and the associating request to the charging pile causing the charging pile to transfer the charging request and the associating request to the charging management device.

In some embodiments, the at least one processor may further receive a current charging status of the electric vehicle sent by the charging management device. The at least one processor may display the current charging status on the user interface.

In some embodiments, the at least one processor may further receive a stop charging request via the user interface.

In some embodiments, the at least one processor may further receive a charging fee sent by the charging management device. The at least one processor may cause a display to display the charging fee on the user interface. The at least one processor may obtain a payment confirmation for the charging fee from the user interface. The at least one processor may send the payment confirmation to the charging management device causing the charging management device to deduct the charging fee from an electronic financial account associated with the client terminal.

According to another aspect of the present disclosure, a system is provided. The system may include at least one storage media and at least one processor configured to communicate with the at least one storage media. The at least one storage media may store a set of instructions for operating an online to offline service platform. When executing the set of instructions, the at least one processor may be directed to perform one or more of the following operations. The at least one processor may receive a request for charging station recommendation from a client terminal. The at least one processor may determine at least one charging station within a preset distance range of the client terminal. The at least one processor may determine an evaluation for each of the at least one charging station based on one or more evaluation parameters. The one or more evaluation parameters may include at least one of: a price discount provided by the each of the at least one charging station, a distance between the each of the at least one charging station and the client terminal, a preset recommendation value for the each of the at least one charging station, or a historical evaluation of the each of the at least one charging station. The at least one processor may transmit the evaluation of the each of the at least one charging station and an identifier of the each of the at least one charging station to the client terminal.

According to another aspect of the present disclosure, a system is provided. The system may include at least one storage media and at least one processor configured to communicate with the at least one storage media. The at least one storage media may store a set of instructions for operating an online to offline service platform. When executing the set of instructions, the at least one processor may be directed to perform one or more of the following operations. The at least one processor may receive a charging request and an associating request for connecting a client terminal and a charging management device from a charging pile. The at least one processor may determine charging information for charging an electric vehicle associated with the client terminal based on the charging request. The at least one processor may establish a connection between the charging management device and the client terminal based on the associating request. The at least one processor may send the charging information to the charging pile for charging the electric vehicle based on the charging information.

According to another aspect of the present disclosure, a system is provided. The system may include at least one storage media and at least one processor configured to communicate with the at least one storage media. The at least one storage media may store a set of instructions for operating an online to offline service platform. When executing the set of instructions, the at least one processor may be directed to perform one or more of the following operations. The at least one processor may determine whether the charging pile is connected with an electric vehicle. The at least one processor may determine a client terminal associated with the electric vehicle in response to a determination that the charging pile is connected with the electric vehicle. The at least one processor may send a charging prompt and an associating prompt to the client terminal. The at least one processor may receive a charging request for charging the electric vehicle at the charging pile and an associating request for connecting the client terminal with a charging management device from the client terminal. The at least one processor may send the charging request and the associating request to the charging management device via the data exchange port.

According to another aspect of the present disclosure, a system is provided. The system may include at least one storage media and at least one processor configured to communicate with the at least one storage media. The at least one storage media may store a set of instructions for operating an online to offline service platform. When executing the set of instructions, the at least one processor may be directed to perform one or more of the following operations. The at least one processor may receive a charging prompt and an associating prompt from a charging pile via the data exchange port after the charging pile is connected to an electric vehicle associated with the client terminal. The at least one processor may cause a user interface of the client terminal to display the charging prompt. The at least one processor may generate a charging request for charging the electric vehicle based on a user interaction on the user interface. The at least one processor may generate an associating request for connecting the client terminal with a charging management device based on the associating prompt. The at least one processor may send the charging request and the associating request to the charging pile causing the charging pile to transfer the charging request and the associating request to the charging management device.

According to another aspect of the present disclosure, a non-transitory computer readable medium may comprise at least one set of instructions for providing an online to offline service. The at least one set of instructions may executed by at least one processor. The at least one processor may receive a request for charging station recommendation from a client terminal. The at least one processor may determine at least one charging station within a preset distance range of the client terminal. The at least one processor may determine an evaluation for each of the at least one charging station based on one or more evaluation parameters. The one or more evaluation parameters include at least one of: a price discount provided by the each of the at least one charging station, a distance between the each of the at least one charging station and the client terminal, a preset recommendation value for the each of the at least one charging station, or a historical evaluation of the each of the at least one charging station. The at least one processor may transmit the evaluation of the each of the at least one charging station and an identifier of the each of the at least one charging station to the client terminal.

According to another aspect of the present disclosure, a non-transitory computer readable medium may comprise at least one set of instructions for providing an online to offline service. The at least one set of instructions may executed by at least one processor. The at least one processor may receive a charging request and an associating request for connecting a client terminal and a charging management device from a charging pile. The at least one processor may determine charging information for charging an electric vehicle associated with the client terminal based on the charging request. The at least one processor may establish a connection between the charging management device and the client terminal based on the associating request. The at least one processor may send the charging information to the charging pile for charging the electric vehicle based on the charging information.

According to another aspect of the present disclosure, a non-transitory computer readable medium may comprise at least one set of instructions for providing an online to offline service. The at least one set of instructions may executed by at least one processor. The at least one processor may determine whether the charging pile is connected with an electric vehicle. The at least one processor may determine a client terminal associated with the electric vehicle in response to a determination that the charging pile is connected with the electric vehicle. The at least one processor may send a charging prompt and an associating prompt to the client terminal. The at least one processor may receive a charging request for charging the electric vehicle at the charging pile and an associating request for connecting the client terminal with a charging management device from the client terminal. The at least one processor may send the charging request and the associating request to the charging management device via the data exchange port.

According to another aspect of the present disclosure, a non-transitory computer readable medium may comprise at least one set of instructions for providing an online to offline service. The at least one set of instructions may executed by at least one processor. The at least one processor may receive a charging prompt and an associating prompt from a charging pile via the data exchange port after the charging pile is connected to an electric vehicle associated with the client terminal. The at least one processor may cause a user interface of the client terminal to display the charging prompt. The at least one processor may generate a charging request for charging the electric vehicle based on a user interaction on the user interface. The at least one processor may generate an associating request for connecting the client terminal with a charging management device based on the associating prompt. The at least one processor may send the charging request and the associating request to the charging pile causing the charging pile to transfer the charging request and the associating request to the charging management device.

According to another aspect of the present disclosure, a system is provided. The system may have at least one processor and storage. The system may include a receiving unit configured to receive a request for charging station recommendation from a client terminal. The system may include a determining unit configured to determine at least one charging station within a preset distance range of the client terminal. The system may include a calculating unit configured to determine an evaluation for each of the at least one charging station based on one or more evaluation parameters. The one or more evaluation parameters include at least one of: a price discount provided by the each of the at least one charging station, a distance between the each of the at least one charging station and the client terminal, a preset recommendation value for the each of the at least one charging station, or a historical evaluation of the each of the at least one charging station. The system may include a pushing unit configured to transmit the evaluation of the each of the at least one charging station and an identifier of the each of the at least one charging station to the client terminal.

According to another aspect of the present disclosure, a system is provided. The system may have at least one processor and storage. The system may include a receiving unit configured to receive a charging request and an associating request for connecting a client terminal and a charging management device from a charging pile. The system may include a determining unit configured to determine charging information for charging an electric vehicle associated with the client terminal based on the charging request. The system may include a connecting unit configured to establish a connection between the charging management device and the client terminal based on the associating request. The system may include a sending unit configured to send the charging information to the charging pile for charging the electric vehicle based on the charging information.

According to another aspect of the present disclosure, a system is provided. The system may have at least one processor and storage. The system may include a determining unit configured to determine whether the charging pile is connected with an electric vehicle, and determine a client terminal associated with the electric vehicle in response to a determination that the charging pile is connected with the electric vehicle. The system may include a sending unit configured to send a charging prompt and an associating prompt to the client terminal. The system may include a receiving unit configured to receive a charging request for charging the electric vehicle at the charging pile and an associating request for connecting the client terminal with a charging management device from the client terminal. The system may include a sending unit configured to send the charging request and the associating request to the charging management device via the data exchange port.

According to another aspect of the present disclosure, a system is provided. The system may have at least one processor and storage. The system may include a receiving unit configured to receive a charging prompt and an associating prompt from a charging pile via the data exchange port after the charging pile is connected to an electric vehicle associated with the client terminal. The system may include a displaying unit configured to cause a user interface of the client terminal to display the charging prompt. The system may include a generating unit configured to generate a charging request for charging the electric vehicle based on a user interaction on the user interface, and generate an associating request for connecting the client terminal with a charging management device based on the associating prompt. The system may include a sending unit configured to send the charging request and the associating request to the charging pile causing the charging pile to transfer the charging request and the associating request to the charging management device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 13 is a flowchart illustrating an exemplary process for charging an electric vehicle according to some embodiments of the present disclosure;

DETAIL DESCRIPTION

Figure 1:
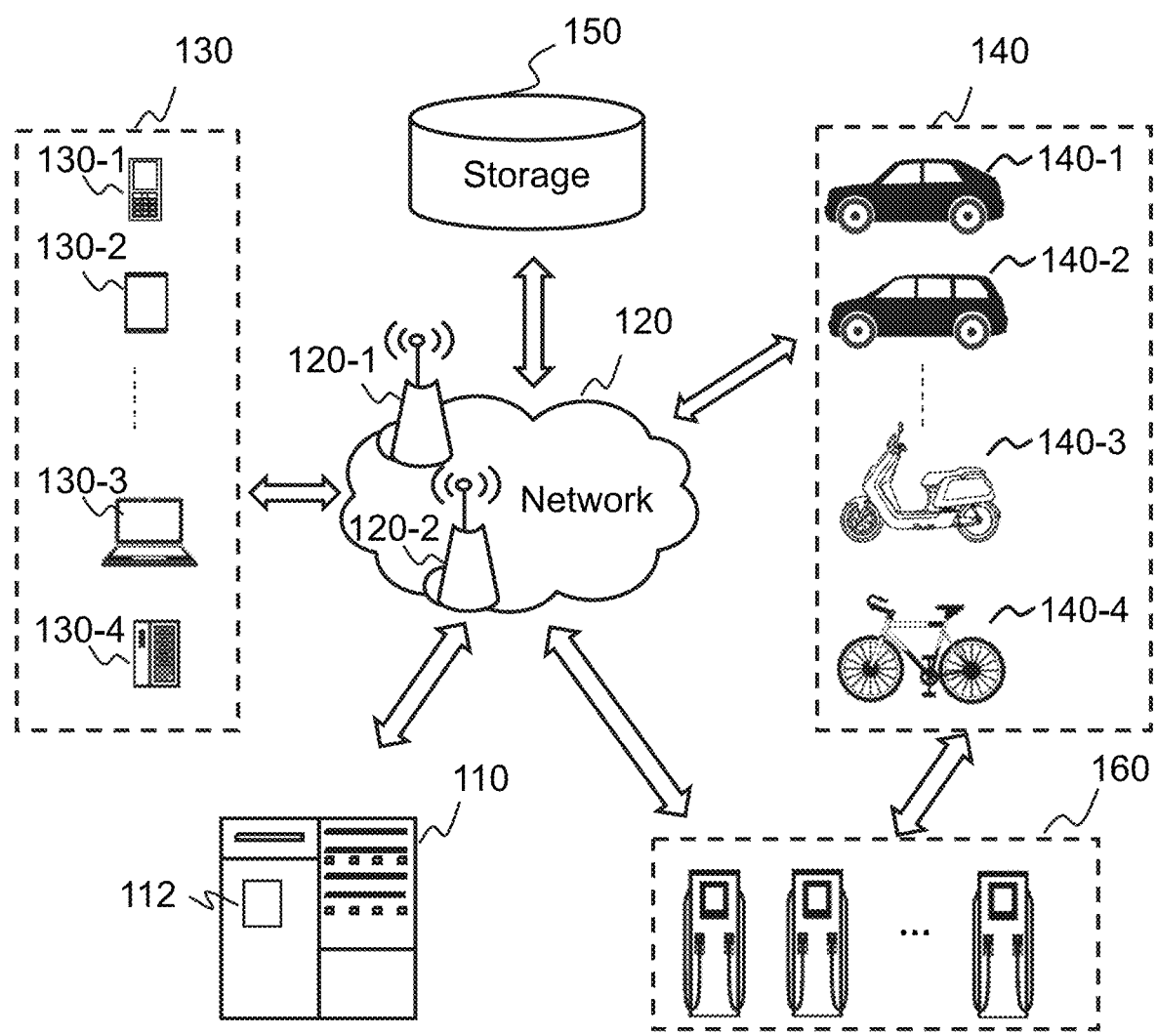
FIG. 1 is a schematic diagram of an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to process a query, it should also be understood that this is only one exemplary embodiment. The system or method of the present disclosure may be applied to any other kind of search service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity that may request or order a service. Also, the term "driver," "provider," "service provider," and "supplier" in the present disclosure are used interchangeably to refer to an individual, entity or a tool that may provide a service or facilitate the providing of the service. The term "user" in the present disclosure may refer to an individual, an entity that may request a service, order a service, provide a service, or facilitate the providing of the service. For example, the user may be a passenger, a driver, an operator, or the like, or any combination thereof. In the present disclosure, "passenger," "user equipment," "client terminal," and "passenger terminal" may be used interchangeably, and "driver" and "driver terminal" may be used interchangeably.

The term "service request" refers to a request that may be initiated by a user (e.g., a passenger, a requester, an operator, a service requester, a customer, a driver, a provider, a service provider, a supplier). For example, the service request may relate to a charging station recommendation. As another example, the service request may relate to charge an electric vehicle using a charging pile.

The system may find applications in many fields, e.g., a taxi transportation service, a driving application, a distributing application, a map application, or a navigation application, etc.

An aspect of the present disclosure relates to systems and methods for online to offline service. The system may receive a request for charging station recommendation from a client terminal. The system may determine at least one charging station within a preset distance range of the client terminal. The system may evaluate each of the at least one charging station based on one or more evaluation parameters. The one or more evaluation parameters include at least one of a price discount provided by the each of the at least one charging station, a distance between the each of the at least one charging station and the client terminal, a preset recommendation value for the each of the at least one charging station, or a historical evaluation of the each of the at least one charging station. The system may transmit the evaluation of the each of the at least one charging station and an identifier of the each of the at least one charging station to the client terminal.

FIG. 1 is a block diagram of an exemplary online to offline service system 100 according to some embodiments of the present disclosure. For example, the online to offline service system 100 may be an online transportation service platform for transportation service such as taxi hailing, chauffeur service, express car, carpool, bus service, driver hire and shuttle service. Further, the online transportation service platform may include a charging service platform for electric vehicles, such as electric cars, electric motorcycles, electric bicycle, etc. The online to offline service system 100 may include a server 110, a network 120, one or more client terminals 130, one or more electric vehicles 140, storage 150, and one or more charging stations 160. It should be noted that the online to offline service system 100 shown in FIG. 1 is merely an example, and not intended to be limiting.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the one or more client terminals 130, and/or the storage 150 via the network 120. As another example, the server 110 may be directly connected to the one or more client terminals 130, the storage 150, and/or one or more charging stations 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 300 having one or more components illustrated in FIG. 3 in the present disclosure.

In some embodiments, the server 110 may include one or more processing devices 112. The processing device 112 may process information and/or data relating to charging station recommendation and/or charging management to perform one or more functions described in the present disclosure. For example, the processing device 112 may receive a request for charging station recommendation from the client terminal 130. The processing device 112 may determine one or more charging stations based on the request for charging station recommendation and transmit the determined one or more charging stations to the client terminal 130. As another example, the processing device 112 may receive a request for charging an electric vehicle (e.g., an electric car 140-1) from a charging pile at the charging station 160. The processing device 112 may control the charging pile to charge the electric vehicle. More descriptions for the processing device 112 may be found elsewhere in the present disclosure (e.g., FIG. 4, and the descriptions thereof).

In some embodiments, the processing device 112 may include one or more processing engines (e.g., signal-core processing engine(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the online to offline service system 100 (e.g., the server 110, the one or more client terminals 130, or the storage 150) may send information and/or data to other component(s) in the online to offline service system 100 via the network 120. For example, the server 110 may obtain/acquire service request from the client terminal 130 via the network 120. In some embodiments, the network 120 may be any type of wired or wireless network, or any combination thereof. Merely by way of example, the network 120 may include a cable network, a wireline network, an optical fiber network, a telecommunications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, the client terminal 130 may include a mobile device 130-1, a tablet computer 130-2, a laptop computer 130-3, a built-in device in a motor vehicle 130-4, or the like, or any combination thereof. In some embodiments, the client terminal 130 may facilitate a communication and/or interaction between the processing device 112 and a user associated with the client terminal 130. For example, the client terminal 130 may generate a request for charging station recommendation based on an input entered by the user via a user interface. The processing device 112 may receive the request for charging station recommendation from the client terminal 130. As another example, the processing device 112 may transmit one or more charging stations to the client terminal 130 to be displayed for the user.

In some embodiments, the client terminal 130 may be connected to and/or communicate with a charging pile at the charging station 160. For example, the client terminal 130 may receive a charging prompt and an associating prompt from the charging pile via a data exchange port implemented on the client terminal 130 after the charging pile is connected to an electric vehicle. The client terminal 130 may generate a charging request for charging the electric vehicle based on the charging prompt according to a user interaction inputted by the user via the user interface. The client terminal 130 may generate an associating request for connecting the client terminal with a charging management device based on the associating prompt. The client terminal 130 may send the charging request and the associating request to the charging pile causing the charging pile to transfer the charging request and the associating request to the processing device 112.

In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the client terminal 130 may be a device with positioning technology for locating the position of the service requester and/or the client terminal 130.

The one or more electric vehicles 140 may include one or more electric cars (e.g., an electric car 140-1, an electric car 140-2, etc.), one or more electric motors 140-3, one or more electric bikes 140-4, or the like, or the combination thereof. The electric vehicle 140 may include an identifier configured to distinguish with other electric vehicles. The identifier of the electric vehicle 140 may include vehicle information such as vehicle type, vehicle brand, vehicle license, vehicle number, or the like, or a combination thereof. The information relating to the client terminal 130 may include identification information associated with the client terminal 130 (e.g., the MAC address of a mobile phone), an electronic bank account associated with the client terminal 130, or the like, or a combination thereof.

The storage 150 may store data and/or instructions. In some embodiments, the storage 150 may store data obtained from the one or more client terminals. For example, the storage 150 may store a request for charging station recommendation and/or charging an electric vehicle from the client terminal 130. As another example, the storage 150 may store the vehicle information relating to the electric vehicle 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the online to offline service system 100 (e.g., the server 110, the one or more client terminals, etc.). One or more components in the online to offline service system 100 may access the data and/or instructions stored in the storage 150 via the network 120. In some embodiments, the storage 150 may be directly connected to or communicate with one or more components in the online to offline service system 100 (e.g., the server 110, the one or more client terminals, etc.). In some embodiments, the storage 150 may be part of the server 110.

In some embodiments, one or more components in the online to offline service system 100 (e.g., the server 110, the one or more client terminals, etc.) may have a permission to access the storage 150. In some embodiments, one or more components in the online to offline service system 100 may read and/or modify information relating to the client terminal 130 when one or more conditions are met. For example, the server 110 may read and/or modify one or more users' information after a service (for example, charging service.

In some embodiments, information exchanging of one or more components of the online to offline service system 100 may be achieved by way of requesting a search service. The object of the search service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

The charging station 160 may include one or more charging piles configured to charge an electric vehicle (e.g., the electric vehicle 140). In some embodiments, a charging pile may have at least one processor, at least one storage device, and a data exchange port communicatively connected to the network 120. In some embodiments, the charging pile (e.g., the at least one processor) may determine whether the charging pile is connected with an electric vehicle. The charging pile may determine a client terminal associated with the electric vehicle in response to a determination that the charging pile is connected with the electric vehicle. The charging pile may send a charging prompt and an associating prompt to the client terminal. The charging pile may receive a charging request for charging the electric vehicle at the charging pile and an associating request for connecting the client terminal with a charging management device (e.g., the processing device 112) from the client terminal. The charging pile may send the charging request and the associating request to the charging management device (e.g., the processing device 112) via the data exchange port. In some embodiments, the charging pile may receive, by the at least one processor charging information from the charging management device (e.g., the processing device 112) and operate, by the at least one processor, the charging pile to charge the electric vehicle based on the charging information. The charging information may include one or more charging parameters, for example, charging volume, charging percentage, charging duration, etc.

One of ordinary skill in the art would understand that when an element of the online to offline service system 100 performs, the element may perform through electrical signals and/or electromagnetic signals. For example, when the client terminal 130 processes a task, such as making a determination, identifying or selecting an object, the client terminal 130 may operate logic circuits in its processor to process such task. When the client terminal 130 sends a request (e.g., a charging request, a request for charging station recommendation, etc.) to the server 110, a processor of the client terminal 130 may generate electrical signals encoding the request. The processor of the client terminal 130 may then send the electrical signals to an output port. If the client terminal 130 communicates with the server 110 via a wired network, the output port may be physically connected to a cable, which further transmit the electrical signal to an input port of the server 110. If the client terminal 130 communicates with the server 110 via a wireless network, the output port of the client terminal 130 may be one or more antennas, which convert the electrical signal to electromagnetic signal. Similarly, a client terminal 130 may process a task through operation of logic circuits in its processor, and receive an instruction and/or service request from the server 110 via electrical signal or electromagnet signals. Within an electronic device, such as the client terminal 130, a charging pile 160, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
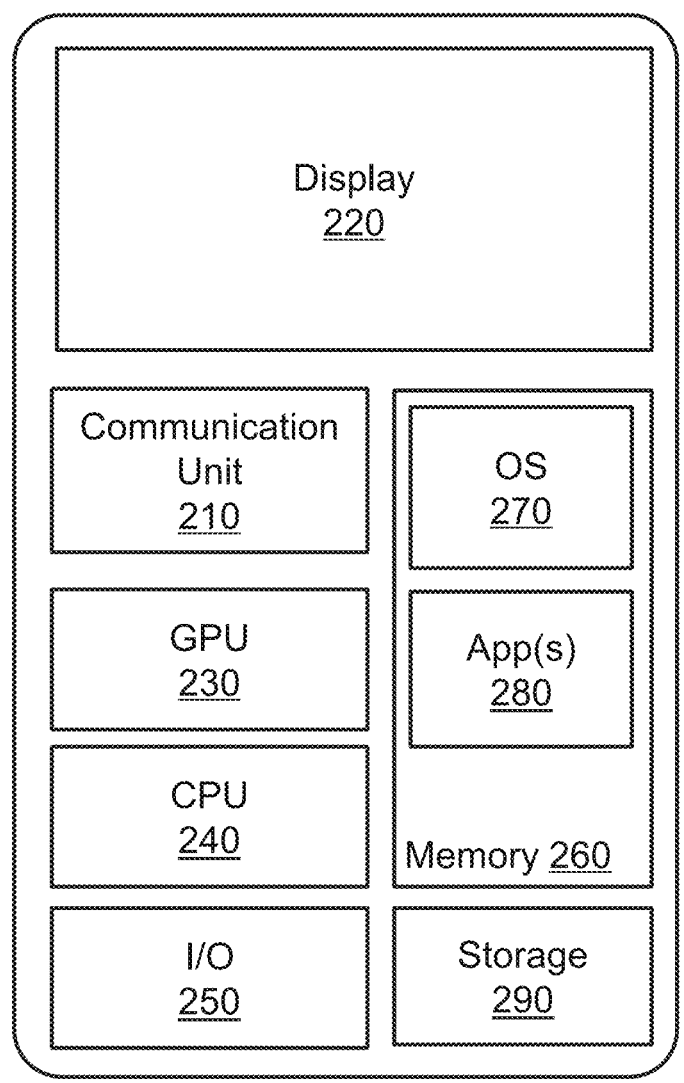
FIG. 2 is a block diagram of an exemplary mobile device configured to implement a specific system disclosed in the present disclosure.

FIG. 2 is a block diagram of an exemplary mobile device configured to implement a specific system disclosed in the present disclosure. In some embodiments, a client terminal device configured to display and communicate information related to locations may be a mobile device 200. The mobile device may include but is not limited to a smartphone, a tablet computer, a music player, a portable game console, a GPS receiver, a wearable calculating device (e.g. glasses, watches, etc.), or the like. The mobile device 200 may include one or more central processing units (CPUs) 240, one or more graphical processing units (GPUs) 230, a display 220, a memory 260, a communication unit 210, a storage unit 290, and one or more input/output (I/O) devices 250. Moreover, the mobile device 200 may also be any other suitable component that includes but is not limited to a system bus or a controller (not shown in FIG. 2). As shown in FIG. 2, a mobile operating system 270 (e.g. 1OS, Android, Windows Phone, etc.) and one or more applications 280 may be loaded from the storage unit 290 to the memory 260 and implemented by the CPUs 240. The application 280 may include a browser or other mobile applications configured to receive and process information related to a query (e.g., a name of a location) inputted by a user in the mobile device 200. The user may obtain information related to one or more search results through the system I/O device 250, and provide the information to the server 110 and/or other modules or units of the online to offline service system 100 (e.g., the network 120).

In order to implement various modules, units and their functions described above, a computer hardware platform may be used as hardware platforms of one or more elements (e.g., the server 110 and/or other sections of the online to offline service system 100 described in FIG. 1 through FIG. 16). Since these hardware elements, operating systems and program languages are common, it may be assumed that persons skilled in the art may be familiar with these techniques and they may be able to provide information required in the online to offline service according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the Figures.

Figure 3:
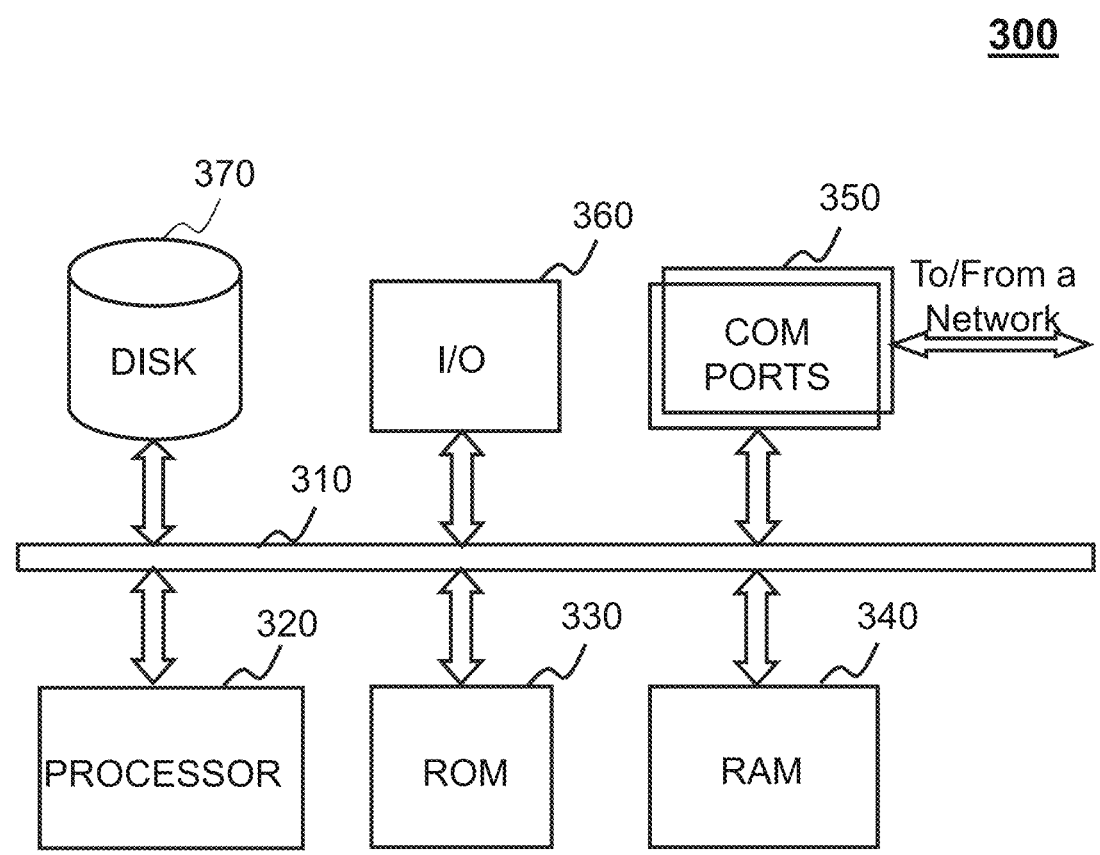
FIG. 3 is a block diagram illustrating an exemplary computing device according to some embodiments of the present disclosure.

FIG. 3 is a block diagram illustrating exemplary hardware and software components of a computing device 300 on which the server 110, the client terminal 130, and the charging station 160 may be implemented according to some embodiments of the present disclosure. The computing device 300 may be configured to perform one or more functions of the server 110, the client terminal 130, and the charging station 160 disclosed in this disclosure. For example, the processing device 112 may be implemented on the computing device 300 and configured to perform functions of the processing device 112 disclosed in this disclosure.

The computing device 300 may be a general-purpose computer or a special purpose computer, both may be used to implement an online to offline service system 100 for the present disclosure. The computing device 300 may be used to implement any component of the online to offline service system 100 as described herein. For example, the processing device 112 may be implemented on the computing device 300, via its hardware, software program, firmware, or a combination thereof. Although only one such computer is shown, for convenience, the computer functions relating to the search service as described herein may be implemented in a distributed fashion on a number of similar platforms to distribute the processing load.

The computing device 300, for example, may include COM ports 250 connected to and from a network connected thereto to facilitate data communications. The computing device 300 may also include a processor 320, in the form of one or more processors, for executing program instructions. The exemplary computer platform may include an internal communication bus 310, program storage and data storage of different forms, for example, a disk 370, and a read only memory (ROM) 330, or a random access memory (RAM) 340, for various data files to be processed and/or transmitted by the computer. The exemplary computer platform may also include program instructions stored in the ROM 330, RAM 340, and/or other type of non-transitory storage medium to be executed by the processor 320. The methods and/or processes of the present disclosure may be implemented as the program instructions. The computing device 300 may also include an I/O component 360, supporting input/output between the computer and other components therein. The computing device 300 may also receive programming and data via network communications.

The computing device 300 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in the computing device 300. However, it should be noted that the computing device 300 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 300 executes both operation A and operation B, it should be understood that operation A and operation B may also be performed by two different CPUs and/or processors jointly or separately in the computing device 300 (e.g., the first processor executes operation A and the second processor executes operation B, or the first and second processors jointly execute operations A and B).

Figure 4:
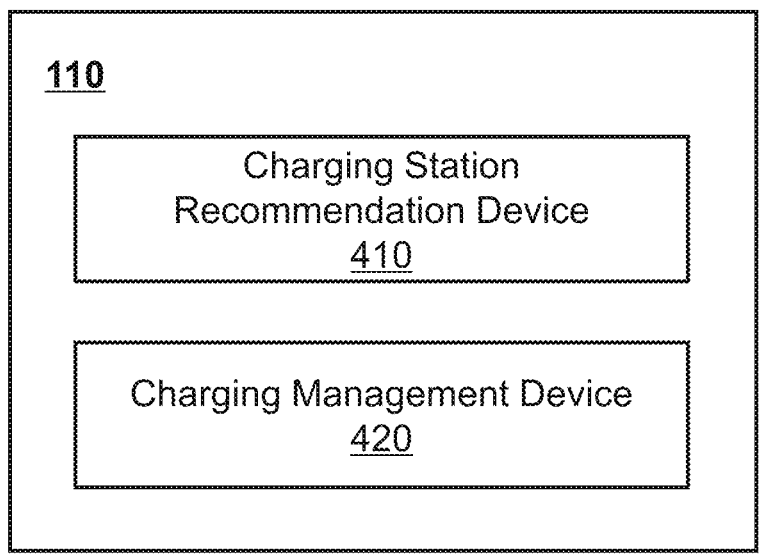
FIG. 4 is a block diagram illustrating an exemplary server according to some embodiments of the present disclosure.

FIG. 4 is a block diagram illustrating an exemplary server 110 according to some embodiments of the present disclosure. The server 110 may include one or more processing devices, such as a charging station recommendation device 410 and a charging management device 420.

The charging station recommendation device 410 may be configured to push at least one charging station to the client terminal 130. For example, the charging station recommendation device 410 may receive a request for charging station recommendation from a client terminal. The charging station recommendation device 410 may determine at least one charging station within a preset distance range of the client terminal 130 and evaluate each of the at least one charging station based on one or more evaluation parameters. The one or more evaluation parameters may include at least one of: a price discount provided by the each of the at least one charging station, a distance between the each of the at least one charging station and the client terminal, a preset recommendation value for the each of the at least one charging station, or a historical evaluation of the each of the at least one charging station. The charging station recommendation device 410 may transmit the evaluation of the each of the at least one charging station and an identifier of the each of the at least one charging station to the client terminal 130. For example, the charging station recommendation device 410 may sort the at least one charging station in a descending order according to the evaluation of the at least one charging station. The charging station recommendation device 410 may send the evaluation of each of the sorted at least one charging station and the identifier of each of the sorted at least one charging station to the client terminal for display. As another example, the charging station recommendation device 410 may determine whether the evaluation of the each of the at least one charging station is greater than or equal to a preset threshold. The charging station recommendation device 410 may send the identifier of the each of the at least one charging station to the client terminal for display in response to a determination that the evaluation is greater than or equal to the preset threshold.

The charging management device 420 may be configured to charging control of the electric vehicle 140. For example, the charging management device 420 may receive a charging request and an associating request for connecting a client terminal and the charging management device from a charging pile. The charging management device 420 may determine charging information for charging an electric vehicle associated with the client terminal based on the charging request. The charging management device 420 may establish a connection between the charging management device and the client terminal based on the associating request. The charging management device 420 may send the charging information to the charging pile for charging the electric vehicle based on the charging information.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the charging station recommendation device 410 and the charging management device 420 may be implemented by two separate severs.

Figure 5:
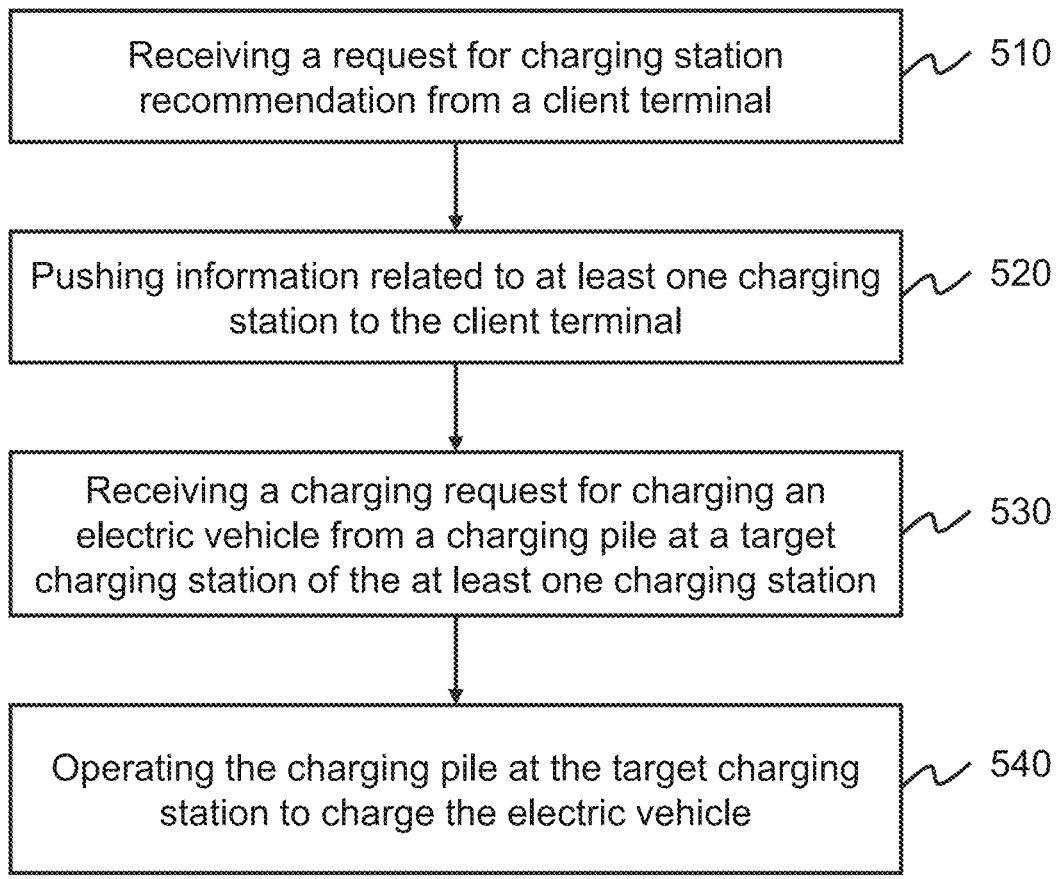
FIG. 5 is a flowchart illustrating an exemplary process 500 for charging an electric vehicle according to some embodiments of the present disclosure.

FIG. 5 is a flowchart illustrating an exemplary process 500 for charging an electric vehicle according to some embodiments of the present disclosure. The process 500 may be executed by the online to offline service system 100. For example, the process 500 may be implemented as a set of instructions (e.g., an application) stored in the storage device 150. The processing device 112 may execute the set of instructions and, when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing device 112 (e.g., the charging station recommendation device 410) may receive a request for charging station recommendation from a client terminal (e.g., the client terminal 130). In some embodiments, the request for charging station recommendation may be generated by the client terminal based on an input entered by a user via a user interface (e.g., an application) of the client terminal. The client terminal may send the charging request to the processing device 112 via the network 120.

In 520, the processing device 112 (e.g., the charging station recommendation device 410) may transmit information related to at least one charging station to the client terminal. The information related to at least one charging station to the client terminal may include an evaluation of the at least one charging station, an identifier of the at least one charging station, an address of the at least one charging station, etc. The processing device 112 (e.g., the charging station recommendation device 410) may determine at least one charging station within a preset distance range of the client terminal in response to the request for charging station recommendation. In some embodiments, the processing device 112 (e.g., the charging station recommendation device 410) may transmit information related to the at least one charging station to the client terminal. In some embodiments, the processing device 112 (e.g., the charging station recommendation device 410) may evaluate each of the at least one charging station based on one or more evaluation parameters. The one or more evaluation parameters may include a price discount provided by the each of the at least one charging station, a distance between the each of the at least one charging station and the client terminal, a preset recommendation value for the each of the at least one charging station, a historical evaluation of the each of the at least one charging station, or the like, or a combination thereof. The processing device 112 (e.g., the charging station recommendation device 410) may transmit the evaluation of the each of the at least one charging station and an identifier of the each of the at least one charging station to the client terminal. More descriptions for transmitting at least one charging station to the client terminal 130 may be found elsewhere in the present disclosure (e.g., FIG. 7 and the descriptions thereof).

In 530, the processing device 112 (e.g., the charging management device 420) may receive a charging request for charging an electric vehicle from a charging pile at a target charging station of the at least one charging station. In some embodiments, the target charging station may be selected by the user manually from the at least one charging station determined in 520. In some embodiments, the target charging station may be automatically determined by the processing device 112. For example, the processing device 112 may determine a charging station nearest from the user or the client terminal as the target charging station. As another example, the processing device 112 may determine a charging station with the highest evaluation as the target charging station.

The charging request may include vehicle information relating to the electric vehicle to be charged. The vehicle information relating to the electric vehicle may include the license number of the electric vehicle, the type of the electric vehicle, the current dump energy of the electric vehicle, the type of a charger for the electric vehicle, etc. In some embodiments, the charging request may be generated by the charging pile when the electric vehicle is connected to the charging pile. The processing device 112 (e.g., the charging management device 420) may receive the charging request from the charging pile. In some embodiments, the charging request may be generated by the client terminal. The processing device 112 (e.g., the charging management device 420) may receive the charging request from the client terminal.

In 540, the processing device 110 (e.g., the charging management device 420) may operate the charging pile at the target charging station to charge the electric vehicle. In some embodiments, the processing device 112 may determine charging information for charging the electric vehicle based on the charging request and send the charging information to the charging pile. The charging information may include one or more reference charging parameters, such as, reference charging volume, reference charging percentage, reference charging duration, reference charging voltage, reference charging current, reference charging fee, etc. For example, the processing device 112 may determine the charging information for charging the electric vehicle based on the vehicle information. The charging pile may charge the electric vehicle based on the charging information.

In some embodiments, the processing device 112 (e.g., the charging management device 420) may receive an association request for connecting the processing device 112 and the client terminal. The processing device 112 (e.g., the charging management device 420) may establish a connection between the client terminal and the processing device 112 based on the association request. In some embodiments, the processing device 112 (e.g., the charging management device 420) may determine whether the charging for the electric vehicle is completed. If the processing device 112 (e.g., the charging management device 420) determines that the charging for the electric vehicle is completed, the processing device 112 (e.g., the charging management device 420) may determine a charging fee corresponding to the charging information and sending the charging fee to the client terminal based on the established connection. The processing device 112 (e.g., the charging management device 420) may further deduct the charging fee from an electronic financial account associated with the client terminal upon receiving a payment confirmation for the charging fee from the client terminal. More descriptions for controlling a charging pile to charge an electric vehicle may be in connection with the process 900 as described in FIG. 9.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 530 and operation 540 may be omitted. As another example, operation 510 and operation 520 may be omitted.

Figure 6:
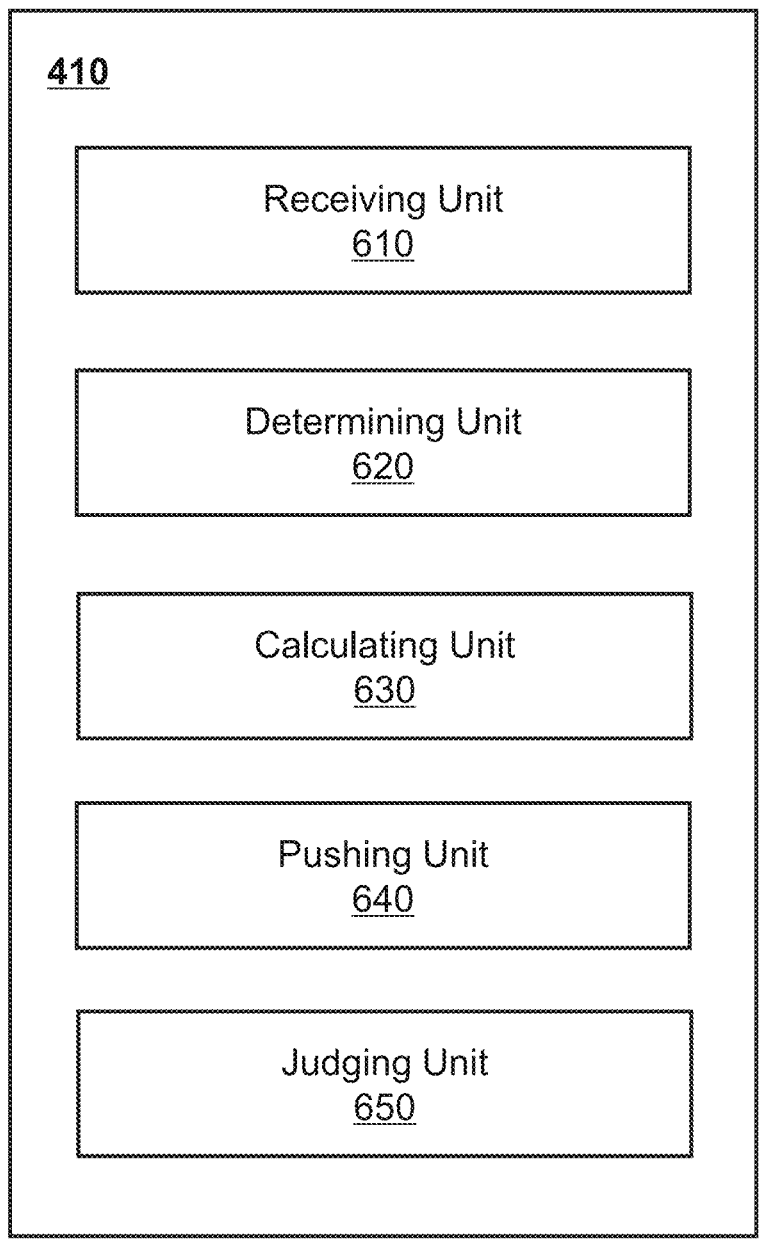
FIG. 6 is a block diagram illustrating an exemplary charging station recommendation device according to some embodiments of the present disclosure.

FIG. 6 is a block diagram illustrating an exemplary charging station recommendation device 410 according to some embodiments of the present disclosure. The charging station recommendation device 410 may include a receiving unit 610, a determining unit 620, a calculating unit 630, a pushing unit 640, and a judging unit 650. The units of the charging station recommendation device 410 may be hardware circuits of at least part of the processing device 112. The units of the device 1400 may also be implemented as an application or set of instructions read and executed by the processing device 112. Further, the units may be any combination of the hardware circuits and the application/instructions. For example, the units of the device 1400 may be the part of the processing device 112 when the processing device 112 is executing the application or set of instructions.

The receiving unit 610 may be configured to receive a request for charging station recommendation from a client terminal (e.g., the client terminal 130). The request for charging station recommendation may be generated by the client terminal based on an input entered by a user on a user interface of the client terminal (e.g., the client terminal 130).

The determining unit 620 may be configured to determine at least one charging station within a preset distance range of the client terminal. The preset distance range may be set and/or adjusted by a user or according to a default setting of the online to offline service system 100. For example, if the determining unit 620 determines that there is no charging station or few charging stations within the preset distance range, the determining unit 620 may increase the preset distance range to determine more charging stations.

The calculating unit 630 may be configured to determine an evaluation for each of the at least one charging station based on one or more evaluation parameters. The one or more evaluation parameters may include a price discount provided by the each of the at least one charging station, a distance between the each of the at least one charging station and the client terminal, a preset recommendation value for the each of the at least one charging station, a historical evaluation of the each of the at least one charging station, or the like, or a combination thereof. In some embodiments, the evaluation of a charging station may be determined based on one or more preset weight values corresponding to the one or more evaluation parameters, respectively.

The pushing unit 640 may be configured to transmit the evaluation of the each of the at least one charging station and an identifier of the each of the at least one charging station to the client terminal. The pushing unit 640 may push the at least one charging station according to a predetermined strategy. For example, the charging station recommendation device 410 may sort the evaluation of the at least one charging station in a descending order or an ascending order. Further, the charging station recommendation device 410 may send the evaluation of each of the sorted at least one charging station and the identifier of each of the sorted at least one charging station to the client terminal for display.

The judging unit 650 may be configured to determine whether the evaluation of the each of the at least one charging station is greater than or equal to a preset threshold. Further, the pushing unit 640 may send the identifier of a target charging station the at least one charging station to the client terminal for display in response to a determination that the evaluation of the target charging station is greater than or equal to the preset threshold.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the determining unit 620 and the calculating unit 630 may be integrated into one single unit. As another example, the judging unit 650 may be integrated into the calculating unit 650 or the determining unit 620.

Figure 7:
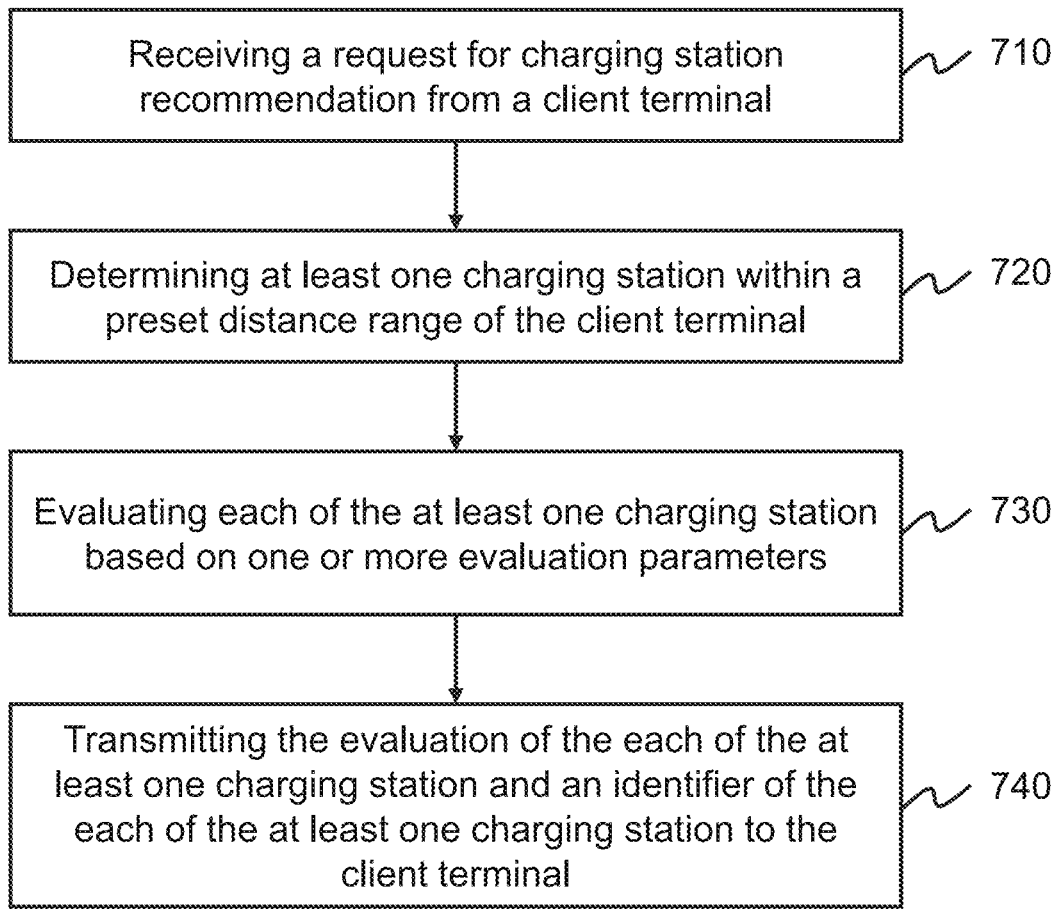
FIG. 7 is a flowchart illustrating an exemplary process for charging station recommendation according to some embodiments of the present disclosure.

FIG. 7 is a flowchart illustrating an exemplary process 500 for charging station recommendation according to some embodiments of the present disclosure. The process 700 may be executed by the system 100. For example, the process 700 may be implemented as a set of instructions (e.g., an application) stored in the storage device 150. The server 110 (e.g., the charging station recommendation device 410) may execute the set of instructions and, when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the charging station recommendation device 410 (e.g., the receiving unit 610) may receive a request for charging station recommendation from a client terminal (e.g., the client terminal 130). In some embodiments, the request for charging station recommendation may be generated by the client terminal. For example, the request for charging station recommendation may be generated based on an input entered by a user via the client terminal (e.g., a user interface or an application). The client terminal may transmit the request for charging station recommendation to the charging station recommendation device 410 via the network 120.

In 720, the charging station recommendation device 410 (e.g., the determining unit 620) may determine at least one charging station within a preset distance range of the client terminal. The preset distance range may be shorter than a distance threshold, such as shorter than 1000 meters, or 500 meters, or 100 meters, etc. The preset distance range may be set and/or adjusted by a user or according to a default setting of the online to offline service system 100. For example, if the charging station recommendation device 410 determines that the number of the at least one charging station within the preset distance range is lower than a quantity threshold, the charging station recommendation device 410 may increase the preset distance range to determine more charging stations. The quantity threshold may be a constant, such as 0, 1, 2, 3, etc.

In 730, the charging station recommendation device 410 (e.g. the calculating unit 630) may evaluate each of the at least one charging station based on one or more evaluation parameters. The one or more evaluation parameters may include a price discount provided by the each of the at least one charging station, a distance between the each of the at least one charging station and the client terminal, a preset recommendation value for the each of the at least one charging station, a historical evaluation of the each of the at least one charging station, a travel duration for arriving at the each of the at least one charging station, a traffic condition associated with the each of the at least one charging station, or the like, or a combination thereof. In some embodiments, the evaluation of a charging station may be determined based on one or more preset weight values corresponding to the one or more evaluation parameters, respectively. The charging station recommendation device 410 may estimate a weighted sum associated with the one or more evaluation parameters based on the one or more preset weight values. The charging station recommendation device 410 may designate the weighted sum associated with the one or more evaluation parameters as the evaluation of the charging station.

In some embodiments, the preset weight value corresponding to an evaluation parameter may be a constant less than 1. The sum of the one or more preset weight values may be equal to value 1. For example, the one or more preset weight values may include a first preset weight value corresponding to the price discount of the each of the at least one charging station being 40%, a second preset weight value corresponding to the distance between the each of the at least one charging station and the client terminal being 35%, a third preset weight value corresponding to the preset recommendation value of the each of the at least one charging station being 20%, and a fourth preset weight value corresponding to the historical evaluation value of the each of the at least one charging station being 5%.

In some embodiments, the preset weight values (e.g., the first preset weight value, the second preset weight value, the third preset weight value, and the fourth preset weight value) may be preset according to users' preference by the user or the charging station recommendation device 410. For example, if the user prefers a specific evaluation parameters more particularly, the user or the charging station recommendation device 410 may adjust the preset weight value corresponding to the specific evaluation parameter. Further, if the user prefers the price discount of a charging station, the user may increase the first preset weight value. The users' preference may be pre-analyzed based on historical data relating to charging stations the user selects or through questionnaires (or other forms).

In some embodiments, the charging station recommendation device 410 may determine the preset recommendation value of a charging station based on one or more recommendation parameters. The one or more recommendation parameters may include the number of charging piles of the charging station, a real-time parking fee at the charging station, a unit charging price associated with the charging station, the number of free charging piles at the charging station, or the like, or a combination thereof.

In some embodiments, the charging station recommendation device 410 may obtain one or more preset percentages corresponding to the one or more recommendation parameters, respectively. Further, the charging station recommendation device 410 may determine the preset recommendation value based on the one or more preset percentages. The preset recommendation value may be equal to a sum of the one or more recommendation parameters multiplying the corresponding preset percentages, respectively. In some embodiments, the preset percentage corresponding to a recommendation parameter may be a constant less than 1. The sum of the one or more preset percentages may be equal to value 1. For example, the one or more preset percentages may include a first preset percentage being 45% corresponding to the number of charging piles of the charging station, a second preset percentage being 35% corresponding to the real-time parking fee at the charging station, and a third preset percentage being 20% corresponding to the charging unit price associated with the charging station.

In some embodiments, the charging station recommendation device 410 may determine the preset recommendation value based on the one or more preset percentages according to Equation (1) described as following:

$$R=Q \times a\%+P \times b\%+F \times c\% \quad (1),$$

where R refers to the preset recommendation value, Q refers to the number of charging piles, P refers to the real-time parking fee, F refers to the charging unit price, a % refers to the first preset percentage, b % refers to the second preset percentage, and c % refers to the third preset percentage.

In some embodiments, a first preset percentage corresponding to the number of charging piles of the charging station may be 45%. A second preset percentage corresponding to the real-time parking fee associated with the each of the at least one charging station may be 35%. A third preset percentage corresponding to the charging unit price associated with the each of the at least one charging station may be 20%.

In this implementation, different charging stations may have different characteristics including the number of charging piles, types, parking fees, charging fee, etc. Therefore, the preset recommendation value may be determined based on the recommendation parameters (e.g., the number of the charging piles, the real-time parking fee, the charging unit price, etc.) and the corresponding preset percentages. The recommendation parameters (e.g., the number of the charging piles, the real-time parking fee, or the charging unit price) having larger influence on the charging station recommendation may be allocated to a larger percentage, thereby improving calculation accuracy and reliability of the recommendation value.

In 740, the charging station recommendation device 410 (e.g., the pushing unit 640) may transmit the evaluation of the each of the at least one charging station and an identifier of the each of the at least one charging station to the client terminal 130. The evaluation of the each of the at least one charging station and the identifier of the each of the at least one charging station may be displayed by the client terminal 130 (e.g., a user interface) for the user. The identifier of a charging station may be configured to identify and/or distinguish the charging station from other charging stations. In some embodiments, the identifier of a charging station may include a number of the charging station, an address of the charging station, a type of the charging station, etc.

In some embodiments, the charging station recommendation device 410 (e.g., the pushing unit 640) may push information related to the at least one charging station to the client terminal according to a predetermined strategy. For example, the charging station recommendation device 410 may sort the evaluation of the at least one charging station in a descending order or an ascending order. In some embodiments, the charging station recommendation device 410 may send the evaluation of each of the sorted at least one charging station and the identifier of each of the sorted at least one charging station to the client terminal for display. In some embodiments, the charging station recommendation device 410 may determine the top specific number (e.g., the top one, the top two, the top three, etc.) of charging stations and send the related information to the client terminal. In this implementation, the user can intuitively and accurately understand the at least one charging station within the preset distance range and the corresponding identifiers. The user may arrange the at least one charging station according to different identifiers and select a charging station to charge his/her vehicle. For example, based on a user satisfaction rating of the at least one charging station, the user can quickly and accurately determine a charging station with better user satisfaction rating, which improves the user's convenience.

As another example, the charging station recommendation device 410 (e.g., the determining unit 620) may determine whether the evaluation of the each of the at least one charging station is greater than or equal to a preset threshold. Further, the charging station recommendation device 410 may send the identifier of a target charging station from the at least one charging station to the client terminal for display in response to a determination that the evaluation of the target charging station is greater than or equal to the preset threshold. In this implementation, the user may more quickly obtain the most suitable charging station among the at least one charging station, thereby improving the user's experience and reducing the processing pressure of the server.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, process 700 may further include storing the evaluation of the each of the at least one charging station.

Figure 8:
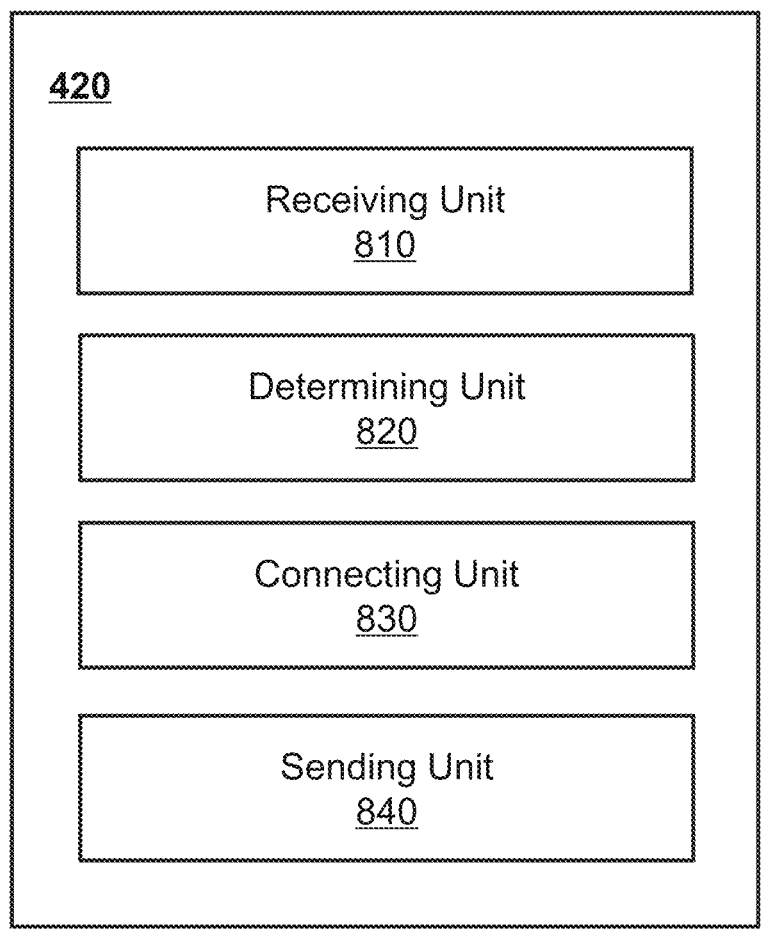
FIG. 8 is a block diagram illustrating an exemplary charging management device 420 according to some embodiments of the present disclosure.

FIG. 8 is a block diagram illustrating an exemplary charging management device 420 according to some embodiments of the present disclosure. The charging management device 420 may include a receiving unit 810, a determining unit 620, a connecting unit 830, and sending unit 840. The units of the charging management device 420 may be hardware circuits of at least part of the processing device 112. The units of the device 1400 may also be implemented as an application or set of instructions read and executed by the processing device 112. Further, the units may be any combination of the hardware circuits and the application/instructions. For example, the units of the device 420 may be the part of the processing device 112 when the processing device 112 is executing the application or set of instructions.

The receiving unit 810 may be configured to receive a charging request for charging an electric vehicle and an associating request from a charging pile. The charging request may include information relating to the electric vehicle. For example, the information relating to the electric vehicle may include the license number of the electric vehicle, the type of the electric vehicle, the current dump energy of the electric vehicle, the type of a charger for the electric vehicle, etc. The associating request may be used for connecting a client terminal (e.g., the client terminal 130) associated with the electric vehicle (e.g., the electric vehicle 140) and the charging management device 420. The associating request may include identification information relating to the client terminal.

The determining unit 820 may be configured to determine charging information for charging the electric vehicle associated with the client terminal based on the charging request. The charging information may include one or more reference charging parameters, such as, reference charging volume, reference charging percentage, reference charging duration, reference charging voltage, reference charging current, reference charging fee, etc. For example, the determining unit 820 may determine the reference charging duration, reference charging fee, and reference charging volume based on the current dump energy of the electric vehicle. As another example, the determining unit 820 may determine the reference charging voltage based on the type of the electric vehicle or the type of the charger for the electric vehicle.

The connecting unit 830 may be configured to establish a connection between the charging management device and the client terminal. In some embodiments, the connection between the charging management device and the client terminal may be generated via a wireless connection, such as the network 120.

The sending unit 840 may be configured to send the charging information to the charging pile for charging the electric vehicle based on the charging information. In some embodiments, the sending unit 840 may send the charging information to the client terminal through the connection between the charging management device 420 and the client terminal.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the receiving unit 810 and the sending unit 840 may be integrated into one single unit.

Figure 9:
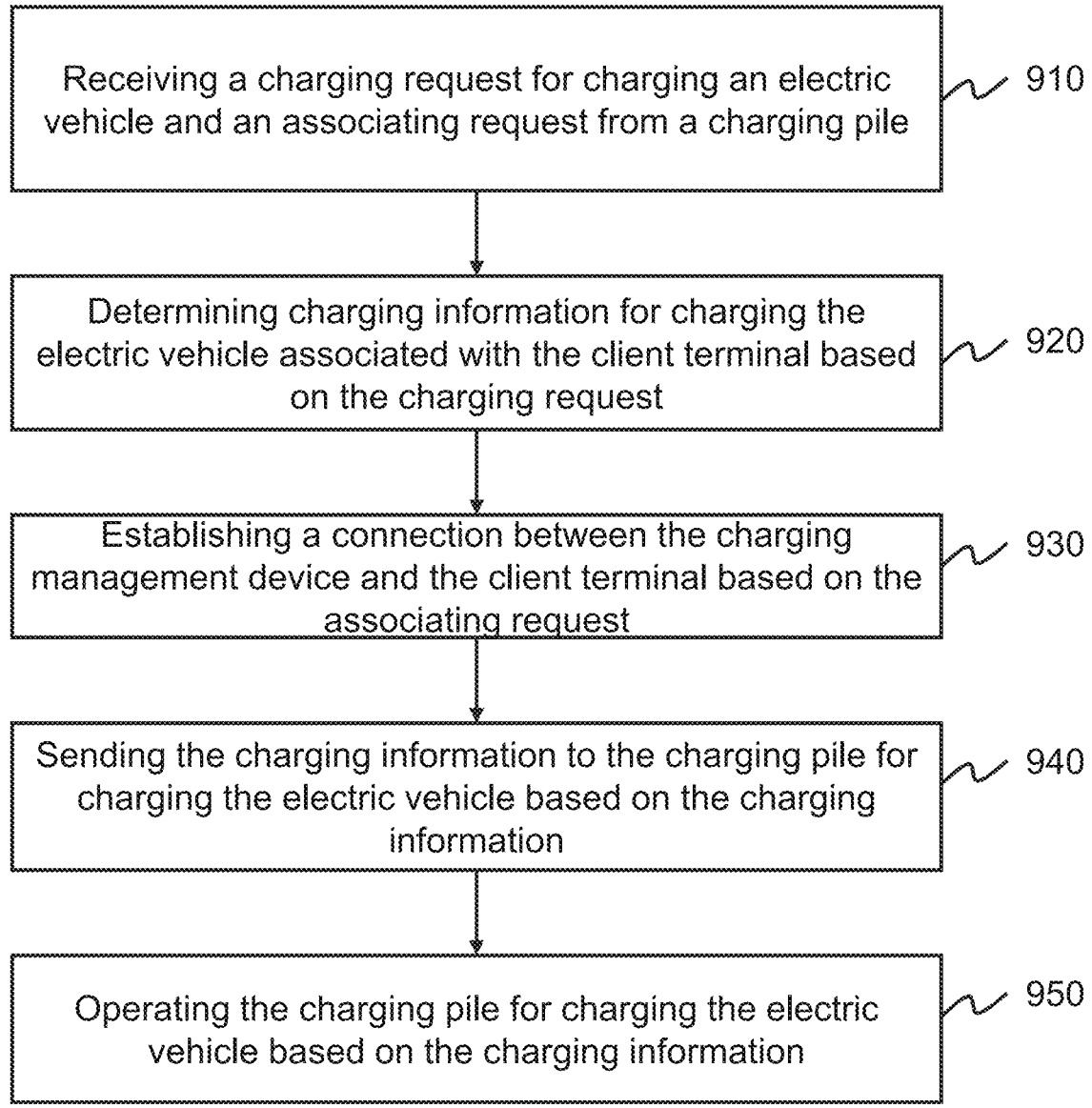
FIG. 9 is a flowchart illustrating an exemplary process for operating a charging pile to charge an electric vehicle according to some embodiments of the present disclosure.

FIG. 9 is a flowchart illustrating an exemplary process 900 for operating a charging pile to charge an electric vehicle according to some embodiments of the present disclosure. The process 900 may be executed by the online to offline service system 100. For example, the process 900 may be implemented on a processing device (e.g., the charging management device 420) having a processor, at least one storage device and a data exchange port communicatively connected to a network. The process 900 may be implemented as a set of instructions (e.g., an application) stored in the storage device 150. The processing device 112 (e.g., the charging management device 420) may execute the set of instructions and, when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the charging management device 420 (e.g., the receiving unit 810) may receive a charging request for charging an electric vehicle and an associating request from a charging pile. The charging request may include information relating to the electric vehicle. For example, the information relating to the electric vehicle may include the license number of the electric vehicle, the type of the electric vehicle, the current dump energy of the electric vehicle, the type of a charger for the electric vehicle, etc. The associating request may be used for connecting a client terminal (e.g., the client terminal 130) associated with the electric vehicle (e.g., the electric vehicle 140) and the charging management device 420 for communication via a network. The associating request may include identification information relating to the client terminal. The identification information relating to the client terminal may be configured to distinguish the client terminal from others, for example, the MAC address of the client terminal, the IMEI of the client terminal, the Pseudo-Unique ID, the Android ID, or the like, or a combination thereof.

In some embodiments, the charging request and/or the associating request may be generated by the charging pile. For example, if the charging pile detects that the electric vehicle is connected to the charging pile via a physical connection (e.g., a wired connection), the charging pile may generate the charging request and/or the associating request. In some embodiments, the charging request and/or the associating request may be generated by the client terminal when the electric vehicle is connected to the charging pile via a physical connection (e.g., a wired connection). The physical connection between the electric vehicle and the charging pile may be identified as a trigger signal to be transmitted to the client terminal. The client terminal may be triggered to generate the charging request and/or the associating request by the trigger signal. In some embodiments, the charging request and/or the associating request may be generated by the client terminal based on an input entered by a user via a user interface of the client terminal 130. The client terminal 130 may send the charging request and the associating request to the charging pile via the network 120.

Figure 11:
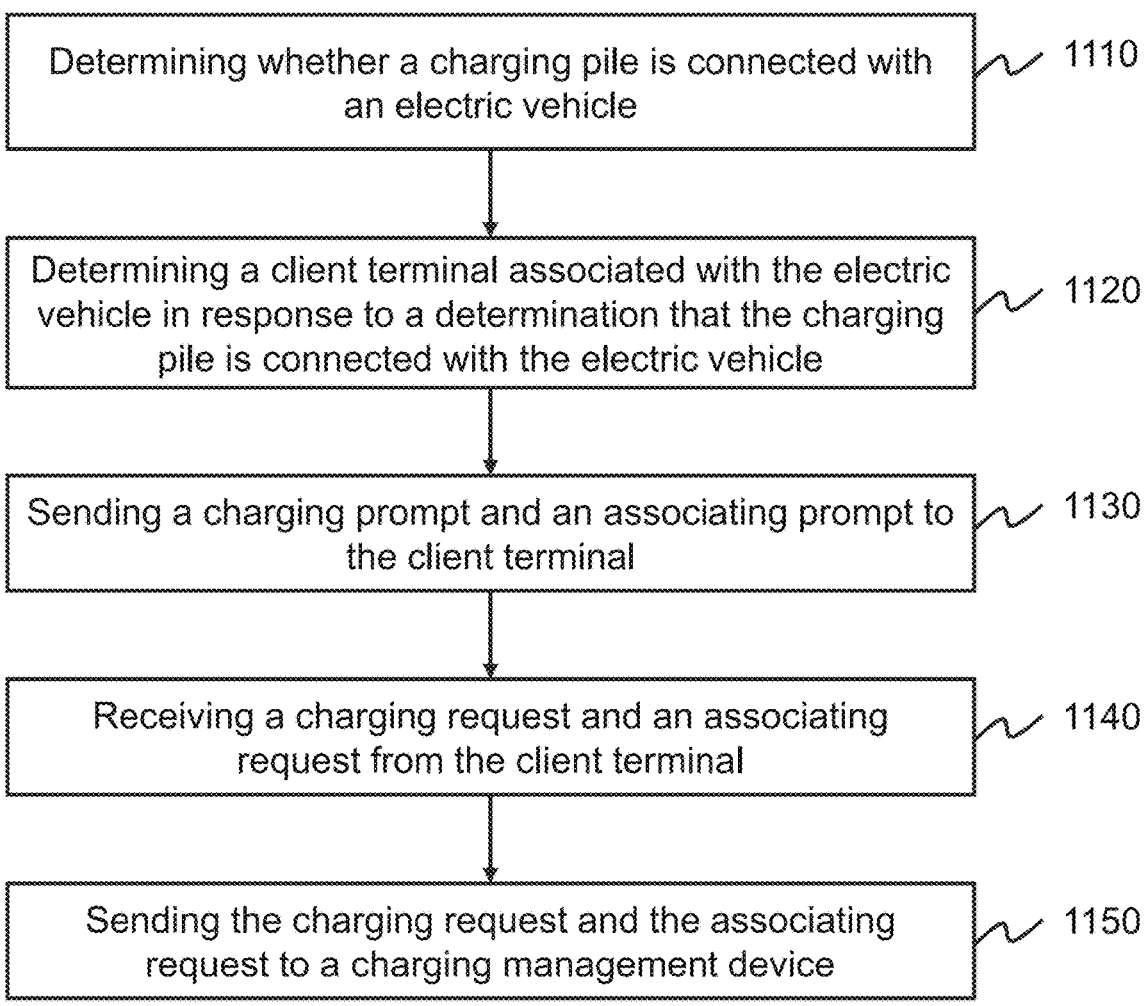
FIG. 11 is a flowchart illustrating an exemplary process for charging an electric vehicle according to some embodiments of the present disclosure.

More descriptions for generating the charging request and/or the associating request by the client terminal may be found elsewhere in the present disclosure (e.g., FIG. 11 and the descriptions thereof).

In 920, the charging management device 420 (e.g., the determining unit 820) may determine charging information for charging the electric vehicle associated with the client terminal based on the charging request. The charging information may include one or more reference charging parameters, such as, a reference charging volume, a reference charging percentage, a reference charging duration, a reference charging voltage, a reference charging current, a reference charging fee, etc. For example, the charging management device 420 (e.g., the determining unit 820) may determine the reference charging duration, the reference charging fee, and/or the reference charging volume based on the current dump energy of the electric vehicle. As another example, the charging management device 420 (e.g., the determining unit 820) may determine the reference charging voltage based on the type of the electric vehicle or the type of the charger for the electric vehicle.

In 930, the charging management device 420 (e.g., the connecting unit 830) may establish a connection between the charging management device 420 and the client terminal based on the associating request. In some embodiments, the connection between the charging management device 420 and the client terminal may be generated via a wireless connection, such as the network 120. The charging management device 420 may communicate with the client terminal via the connection. For example, the charging management device 420 may send the charging fee for charging the electric vehicle to the client terminal. As another example, the charging management device 420 may deduct the charging fee from an electric bank account associated with the client terminal.

In 940, the charging management device 420 (e.g., the sending unit 840) may send the charging information to the charging pile for charging the electric vehicle based on the charging information. In some embodiments, the charging pile may send the charging information to the client terminal after receiving the charging information from the charging management device 420. In some embodiments, the charging management device 420 (e.g., the sending unit 840) may send the charging information to the client terminal through the connection between the charging management device 420 and the client terminal. The user may adjust the charging information determined by the charging management device 420 via a user interface implemented on the client terminal and/or the charging pile. For example, the user may adjust one or more reference charging parameters (e.g., the reference charging duration, the reference charging volume, etc.) according to user' actual demands.

In this embodiment, the charging management device 420 may determine the charging information of the electric vehicle, and directly send the charging information to the charging pile, such that the user can conveniently set the charging information through the client terminal or the charging pile, and the user's experience may be improved.

In 950, the charging management device 420 may operate the charging pile for charging the electric vehicle based on the charging information. In some embodiments, the charging management device 420 may generate a charging signal for starting to charge the electric vehicle after transmitting the charging information to the charging pile. The charging management device 420 may transmit the charging signal to the charging pile and/or the client terminal for display. The charging may be started by the user manually or the charging management device 420 in response to a confirmation for the charging signal from the client terminal.

In some embodiments, the charging management device 420 may obtain a current charging status that the charging pile 160 charges the electric vehicle 140. The charging management device 420 may send the current charging status to the client terminal through the connection between the client terminal 130 and the charging management device 420. The current charging status may include current charging volume, current charging percentage, current charging duration, current charging fee, etc.

In some embodiments, the charging management device 420 may determine whether the charging for the electric vehicle is completed. The charging management device 420 may determine whether the charging for the electric vehicle is completed based on the current charging status and the charging parameters. For example, the charging management device 420 may determine that the charging for the electric vehicle is completed if the charging management device 420 determines that the current charging duration is equal to the reference charging duration. As another example, the charging management device 420 may determine that the charging for the electric vehicle is completed if the charging management device 420 receives a stop charging instruction from the client terminal. In response to a determination that the charging for the electric vehicle is completed, the charging management device 420 may determine a charging fee corresponding to the charging information. For example, the charging management device 420 may determine the reference charging fee as the charging fee if the charging management device 420 determines that the current charging duration (or the current charging volume) is equal to the reference charging duration (or the reference charging volume). As another example, the charging management device 420 may determine the current charging fee as the charging fee if the charging management device 420 receives the stop charging instruction from the client terminal. The charging management device 420 may send the charging fee to the client terminal via the connection between the client terminal and the charging management device 420. The charging management device 420 may deduct the charging fee from an electronic financial account associated with the client terminal upon receiving a payment confirmation for the charging fee from the client terminal. In some embodiments, the user may pre-pay a certain amount of money for charging the electric vehicle. The charging fee is simultaneously deducted from the pre-paid amount during the charging, and the charging management device 420 may determine that the charging for the electric vehicle is completed once the remaining balance of the pre-paid amount reaches zero.

In addition, by receiving the associating request from the charging pile, the charging management device 420 may initiatively establish a connection with the client terminal 130. Therefore, the associating operations to establish the connection between the client terminal and the charging management device 420 that need to be performed by the client terminal is eliminated, and thus, simplifying the operations of the client terminal and improving the charging efficiency. Because the connection between the charging management device 420 and the client terminal is initiated by the charging management device 420, it is also beneficial to improve security of the user's account (e.g., an electric bank account).

Particularly, the physical connection between the charging pile and the electric vehicle may be recognized by the electric vehicle as a trigger signal (e.g., an electric signal of a high level or a high voltage). The electric vehicle may send the trigger signal to the client terminal associated with the electric vehicle. The trigger signal may be used to trigger the client terminal to generate the associating request and the charging request. Before the communication connection is established between the client terminal and the charging management device 420, since the client terminal does not know a communication address of the charging management device 420, the associating request and the charging request may be sent to the charging management device 420 through the charging pile.

In some embodiments, the user may input the charging request via the client terminal. The client terminal may generate the associating request automatically when detecting the charging request to be transmitted to the charging pile. The charging request and the associating request may be transmitted to the charging pile by the client terminal. And the charging pile may send the charging request and the associating request to the charging management device 420 before the client terminal is connected with the charging management device 420. The charging management device 420 may determine the charging information based on the charging request, and operate the charging pile to charge the electric vehicle according to the charging information. The charging management device 420 may also establish the connection with the client terminal according to the association request.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 920 and operation 930 may be performed synchronously. As another example, operation 930 and operation 940 may be performed synchronously. In some embodiments, process 900 may further include storing the charging information for charging the electric vehicle.

Figure 10:
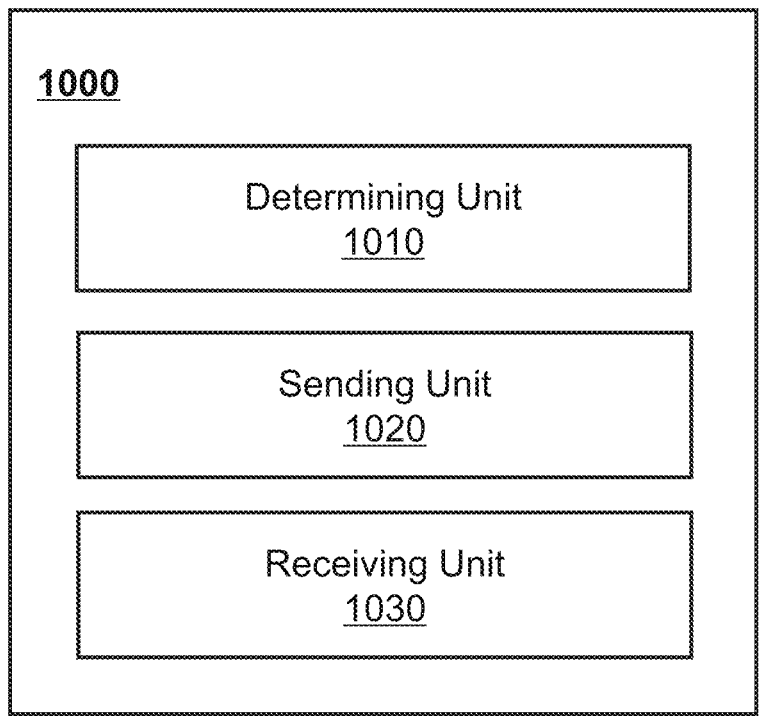
FIG. 10 is a block diagram illustrating an exemplary processor of a charging pile according to some embodiments of the present disclosure.

FIG. 10 is a block diagram illustrating an exemplary processor 1000 of a charging pile according to some embodiments of the present disclosure. The processor 1000 may include a determining unit 1010, a sending unit 1020, and receiving unit 1030. The units of the processor 1000 may be hardware circuits of at least part of the computing device 300. The units of the processor 1000 may also be implemented as an application or set of instructions read and executed by the computing device 300. Further, the units may be any combination of the hardware circuits and the application/instructions. For example, the units of the processor 1000 may be the part of the computing device 300 when the computing device 300 is executing the application or set of instructions.

The determining unit 1010 may be configured to determine whether the charging pile is connected with an electric vehicle. In some embodiments, the electric vehicle may include a charging interface. The processor may determine that the charging pile is connected with the electric vehicle if the processor detects the charging interface. In some embodiments, the determining unit 1010 may determine a client terminal associated with the electric vehicle in response to a determination that the charging pile is connected with the electric vehicle. After detecting the charging interface of the electric vehicle, the processor may actively obtain vehicle information of the electric vehicle via the charging interface. The vehicle information of the electric vehicle may include the license number of the electric vehicle, the type of the electric vehicle, the current dump energy of the electric vehicle, the type of a charger for the electric vehicle, etc. The processor may determine information relating to a client terminal that is associated with the electric vehicle based on the vehicle information. The information relating to the client terminal may include identification information of the client terminal, such as the MAC address of the client terminal, the IMEI of the client terminal, the Pseudo-Unique ID, the Android ID, or the like, or a combination thereof. The processor may further determine the associated client terminal based on the information relating to the client terminal. The associating operations between the client terminal and the charging pile may be simplified by determining the information relating to the client terminal based on the vehicle information, and the user's experience is improved.

The sending unit 1020 may be configured to send a charging prompt and an associating prompt to the client terminal. The charging prompt may include the vehicle information relating to the electric vehicle obtained by the charging pile. The client terminal may display the charging prompt to prompt a user. In some embodiments, the user may adjust the vehicle information based on a user interface of the client terminal. The client terminal may generate a charging request include the adjusted vehicle information. The associating prompt may include the information relating to the client terminal determined by the charging pile. The client terminal may display the associating prompt to prompt the user. In some embodiments, the user may adjust the information relating to the client terminal via the user interface of the client terminal. The client terminal may generate an associating request include the adjusted information relating to the client terminal.

The receiving unit 1030 may be configured to receive a charging request and an associating request from the client terminal. The charging request may be used for charging the electric vehicle at the charging pile. The charging request may include the adjusted vehicle information relating to the electric vehicle. For example, the adjusted vehicle information relating to the electric vehicle may include the license number of the electric vehicle, the type of the electric vehicle, the current dump energy of the electric vehicle, the type of a charger for the electric vehicle, etc. The associating request may be used for connecting the client terminal (e.g., the client terminal 130) associated with the electric vehicle (e.g., the electric vehicle 140) and a charging management device (e.g., the charging management device 420). The associating request may include the adjusted information relating to the client terminal. The adjusted information relating to the client terminal may include the MAC address of the client terminal, the NEI of the client terminal, the Pseudo-Unique ID, the Android ID, or the like, or a combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, processor 1000 may further include a judging unit. As another example, the sending unit 1020 and the receiving unit 1030 may be integrated into one single unit.

FIG. 11 is a flowchart illustrating an exemplary process 1100 for charging an electric vehicle 140 according to some embodiments of the present disclosure. The process 1100 may be executed by the online to offline service system 100.

For example, the process 1100 may be implemented on a charging pile (e.g., a charging pile at the charging station 160) having a processor, at least one storage device and a data exchange port communicatively connected to a network. The process 1100 may be implemented as a set of instructions (e.g., an application) stored in the at least one storage device. The processor of the charging pile may execute the set of instructions and, when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1110, the processor (e.g., the determining unit 1010) may determine whether the charging pile is connected with an electric vehicle (e.g., the electric car 140-1). In some embodiments, the electric vehicle may include a charging interface. The processor may determine that the charging pile is connected with the electric vehicle if the processor detects the charging interface. In some embodiments, the processor (e.g., the determining unit 1010) may determine whether the charging pile is connected with the electric vehicle (e.g., the electric car 140-1) based on a video monitoring system configured to monitor a region surrounding the charging pile. For example, the video monitoring system may acquire image data associated with the charging pile and transfer the image data to the processor. The processor may determine whether the charging pile is connected with the electric vehicle based on the image data.

In 1120, the processor (e.g., the determining unit 1010) may determine a client terminal associated with the electric vehicle in response to a determination that the charging pile is connected with the electric vehicle. After detecting the charging interface of the electric vehicle, the processor may actively obtain vehicle information of the electric vehicle via the charging interface and/or the data exchange port of the charging pile. The vehicle information of the electric vehicle may include the license number of the electric vehicle, the type of the electric vehicle, the current dump energy of the electric vehicle, the type of a charger for the electric vehicle, etc. The processor may further determine information relating to the client terminal that is associated with the electric vehicle. The information relating to the client terminal may include identification information of the client terminal, such as the MAC address of the client terminal, the NEI of the client terminal, the Pseudo-Unique ID, the Android ID, or the like, or a combination thereof. In some embodiments, the client terminal may be connected to the electric vehicle via a wireless connection (e.g., Bluetooth) or a wired connection (e.g., a charging line). The processor may determine information relating to the client terminal based on the connection between the client terminal and the electric vehicle.

The processor may further determine the associated client terminal based on the information relating to the client terminal. The associating operations between the client terminal and the charging pile may be simplified by determining the information relating to the client terminal based on the vehicle information, and therefore, the user's experience is improved.

In 1130, the processor (e.g., the sending unit 1020) may send a charging prompt and an associating prompt to the client terminal. In some embodiments, the charging prompt may include the vehicle information relating to the electric vehicle obtained by the charging pile. The client terminal may display the charging prompt to prompt the user. In some embodiments, the user may adjust the vehicle information based on a user interface of the client terminal. The client terminal may generate a charging request including the vehicle information (or the adjusted vehicle information) relating to the electric vehicle. The associating prompt may include the information relating to the client terminal determined by the charging pile. The client terminal may display the associating prompt to prompt the user. In some embodiments, the user may adjust the information relating to the client terminal via the user interface of the client terminal. The client terminal may generate an associating request include the information (or the adjusted information) relating to the client terminal.

In 1140, the processor (e.g., the receiving unit 1030) may receive a charging request and an associating request from the client terminal. The charging request may be used for charging the electric vehicle at the charging pile. The charging request may include the vehicle information (or the adjusted vehicle information) relating to the electric vehicle. For example, the vehicle information relating to the electric vehicle may include the license number of the electric vehicle, the type of the electric vehicle, the current dump energy of the electric vehicle, the type of a charger for the electric vehicle, etc. The associating request may be used for connecting the client terminal (e.g., the client terminal 130) associated with the electric vehicle (e.g., the electric vehicle 140) and a charging management device (e.g., the charging management device 420) for communication via a network. The associating request may include the information (or the adjusted information) relating to the client terminal. The information relating to the client terminal may include the MAC address of the client terminal, the IMEI of the client terminal, the Pseudo-Unique ID, the Android ID, or the like, or a combination thereof. In some embodiments, the charging request and the associated request may be displayed on a user interface implemented on the charging pile. The user may confirm the charging request and the associating request again before the processor sends the charging request and the associated request to the charging management device (e.g., the charging management device 420).

In 1150, the processor may send the charging request and the associating request to a charging management device via the data exchange port. In some embodiments, the charging management device (e.g., the charging management device 420) may determine charging information for charging the electric vehicle based on the charging request as described elsewhere in the present disclosure (e.g., FIG. 9 and the descriptions thereof). The charging information may include one or more reference charging parameters, such as, a reference charging volume, a reference charging percentage, a reference charging duration, a reference charging voltage, a reference charging current, a reference charging fee, etc. The charging management device (e.g., the charging management device 420) may transmit the charging information to the charging pile for charging the electric vehicle. In some embodiments, the charging management device (e.g., the charging management device 420) may establish a connection between the charging management device and the client terminal based on the associating request.

In some embodiments, the process 1100 (e.g., the receiving unit 1010) may further include receiving the charging information from the charging management device. The processor may operate the charging pile to charge the electric vehicle 140 based on the charging information.

Figure 14:
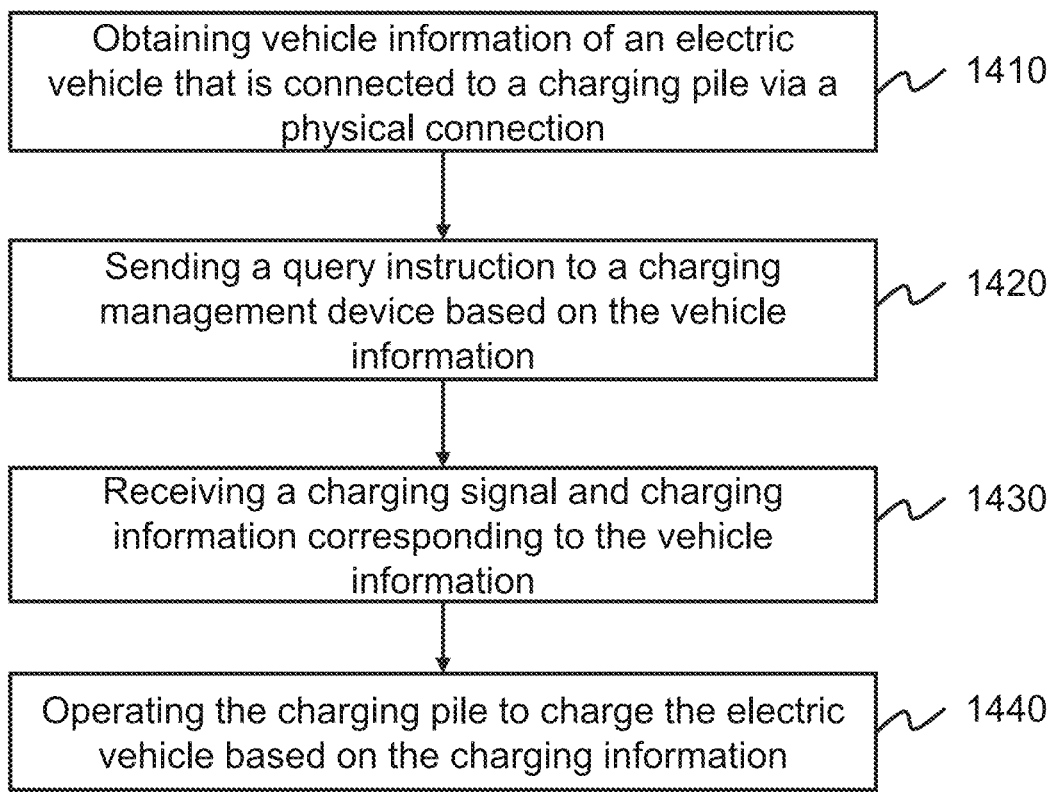
FIG. 14 is a flowchart illustrating an exemplary process for charging an electric vehicle according to some embodiments of the present disclosure.

More descriptions for charging the electric vehicle may be found elsewhere in the present disclosure (e.g., FIG. 14, and the descriptions thereof).

In some embodiments, the process 1100 (e.g., the sending unit 1020) may further include obtaining and sending a current charging status of the electric vehicle to the charging management device 420. The charging management device 420 may determine whether the charging for the electric vehicle is completed based on the current charging status of the electric vehicle. If the charging management device 420 determines that the charging for the electric vehicle is completed, the charging management device 420 may stop the charging pile to charge the electric vehicle. Further, the charging management device 420 may determine a charging fee and send the charging fee to the client terminal and/or the charging pile. Upon receiving a payment confirmation from the charging pile or the client terminal, the charging management device 420 may deduct the charging fee from an electric bank account associated with the client terminal.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1130 and operation 1140 may be omitted. Process 1100 may include generating the charging request and the associating request by the processor of the charging pile.

Figure 12:
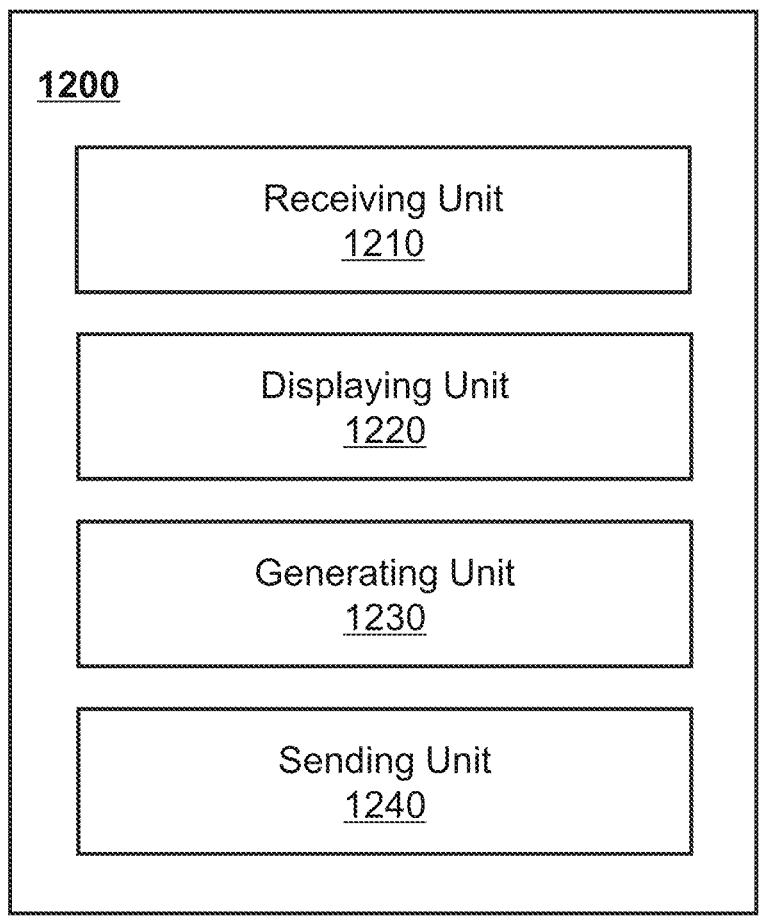
FIG. 12 is a block diagram illustrating an exemplary processor of client terminal according to some embodiments of the present disclosure.

FIG. 12 is a block diagram illustrating an exemplary processor 1200 implemented on the client terminal 130 according to some embodiments of the present disclosure. The processor may include a receiving unit 1210, a displaying unit 1220, a generating unit 1230, and a sending unit 1240. The units of the processor 1200 may be hardware circuits of at least part of the mobile device 200. The units of the processor 1200 may also be implemented as an application or set of instructions read and executed by the mobile device 200. Further, the units may be any combination of the hardware circuits and the application/instructions. For example, the units of the processor 1200 may be the part of the mobile device 200 when the mobile device 200 is executing the application or set of instructions.

The receiving unit 1210 may be configured to receive a charging prompt and an associating prompt from a charging pile via a data exchange port after the charging pile is connected to an electric vehicle associated with the client terminal. The charging prompt may include vehicle information relating to the electric vehicle obtained by the charging pile as described elsewhere in the present disclosure (e.g., FIG. 11 and the descriptions thereof). The associating prompt may include information relating to the client terminal determined by the charging pile as described elsewhere in the present disclosure (e.g., FIG. 11 and the descriptions thereof). The charging pile may send the charging prompt and the associating prompt to the client terminal.

The displaying unit 1220 may be configured to cause a user interface of the client terminal 130 to display the charging prompt and/or the associating prompt. In some embodiments, the client terminal 130 may display the charging prompt and/or the associating prompt on the user interface in the form of text or image. In some embodiments, the client terminal 130 may display the charging prompt and/or the associating prompt to the user via a message in the form of text, voice, image, etc.

The generating unit 1230 may be configured to generate a charging request for charging the electric vehicle based on a user interaction on the user interface. The charging request may be inputted by the user on the user interface. In some embodiments, the user may adjust the vehicle information based on the user interaction on the user interface. The client terminal may generate the charging request include the adjusted vehicle information. In some embodiments, the generating unit 1230 may be configured to generate an associating request for connecting the client terminal with a charging management device based on the associating prompt. The associating request may be used for connecting the client terminal with the charging management device (e.g., the charging management device 420). In some embodiments, the user may adjust the information relating to the client terminal via the user interface of the client terminal. The client terminal may generate the associating request including the adjusted information relating to the client terminal.

The sending unit 1240 may be configured to send the charging request and the associating request to the charging pile. The charging pile may transmit the charging request and the associating request to the charging management device. The charging management device may generate charging information for charging the electric vehicle and the send the charging information to the charging pile. The charging pile may charge the electric vehicle based on the charging information as described elsewhere in the present disclosure (e.g., FIG. 11, and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the sending unit 1040 and the receiving unit 1210 may be integrated into one single unit.

FIG. 13 is a flowchart illustrating an exemplary process 1300 for charging an electric vehicle according to some embodiments of the present disclosure. The process 1300 may be executed by the online to offline service system 100. For example, the process 1300 may be implemented on a client terminal (e.g., the client terminal 130) having a processor, at least one storage device and a data exchange port communicatively connected to a network. The process 1300 may be implemented as a set of instructions (e.g., an application) stored in the at least one storage device. The processor of client terminal may execute the set of instructions and, when executing the instructions, it may be configured to perform the process 1300. The operations of the illustrated process presented below are intended to be illustrative. In some embodiments, the process 1300 may be accomplished with one or more additional operations not described and/or without one or more of the operations discussed. Additionally, the order in which the operations of the process as illustrated in FIG. 13 and described below is not intended to be limiting.

In 1310, the processor (e.g., the receiving unit 1210) may receive a charging prompt and an associating prompt from a charging pile via a data exchange port after the charging pile is connected to an electric vehicle associated with a client terminal. In some embodiments, the charging pile may be connected to the electric vehicle via a charging interface connected with the electric vehicle. The charging prompt and the associating prompt may be generated by the charging pile after the charging pile detects the charging interface.

The charging prompt may include vehicle information relating to the electric vehicle obtained by the charging pile as described elsewhere in the present disclosure (e.g., FIG. 11 and the descriptions thereof). The associating prompt may include information relating to the client terminal determined by the charging pile as described elsewhere in the present disclosure (e.g., FIG. 11 and the descriptions thereof). The charging pile may send the charging prompt and the associating prompt to the client terminal.

In 1320, the processor (e.g., the displaying unit 1220) may cause a user interface of the client terminal 130 to display the charging prompt and/or the associating prompt. In some embodiments, the client terminal 130 may display the charging prompt and/or the associating prompt on the user interface in the form of text or image. In some embodiments, the client terminal 130 may display the charging prompt and/or the associating prompt to the user via a message in the form of text, voice, image, etc.

In 1330, the processor (e.g., the generating unit 1230) may generate a charging request for charging the electric vehicle based on a user interaction on the user interface. In some embodiments, the charging request may be inputted by the user via the user interface. In some embodiments, the user may adjust the vehicle information relating to the electric vehicle based on the user interaction on the user interface. The client terminal may generate the charging request include the adjusted vehicle information.

In 1340, the processor (e.g., the generating unit 1230) may generate an associating request for connecting the client terminal with a charging management device based on the associating prompt. The associating request may be used for connecting the client terminal with the charging management device (e.g., the charging management device 420). In some embodiments, the user may adjust the information relating to the client terminal via the user interface of the client terminal. The client terminal may generate the associating request including the adjusted information relating to the client terminal.

In 1350, the processor (e.g., the sending unit 1240) may send the charging request and the associating request to the charging pile. In some embodiments, the processor (e.g., the sending unit 1240) may send the charging request and the associating request to the charging pile via the data exchange port communicatively connected to a network (e.g., the network 120). The charging pile may further transmit the charging request and the associating request to the charging management device. The charging management device may generate charging information for charging the electric vehicle and the send the charging information to the charging pile. The charging information for charging the electric vehicle may include one or more reference charging parameters as described elsewhere in the present disclosure. The charging pile may charge the electric vehicle based on the charging information as described elsewhere in the present disclosure (e.g., FIG. 11, and the descriptions thereof).

In some embodiments, the client terminal may receive a current charging status of the electric vehicle sent by the charging management device or the charging pile. The client terminal may display the current charging status on the user interface implemented on the client terminal and/or the charging pile for a user.

In some embodiments, the client terminal may generate and/or receive a stop charging request based on an input of the user via the user interface. For example, the user may click a stop button associated with the stop charging request on the user interface. Then the client terminal may generate the stop charging request.

In some embodiments, the client terminal may receive a charging fee generated and sent by the charging management device. The charging management device may determine the charging fee based on the charging information and/or the current charging status. For example, the charging fee may be equal to the reference charging fee or the current charging fee as described in FIG. 9. Further, the charging management device may send the calculated charging fee to the client terminal. The client terminal may display the calculated charging fee on the user interface for the user. The client terminal may obtain a payment confirmation for the charging fee from the user interface by the user. For example, the user may click a button associated with the payment confirmation on the user interface to generate the payment confirmation. The client terminal may send the payment confirmation to the charging management device causing the charging management device to deduct the charging fee from an electronic bank account associated with the client terminal.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1330 and operation 1340 may be performed synchronously.

FIG. 14 is a flowchart illustrating an exemplary process 1400 for charging an electric vehicle according to some embodiments of the present disclosure. The process 1400 may be executed by the online to offline service system 100. For example, the process 1400 may be implemented on a charging pile (e.g., a charging pile at the charging station 160) having a processor, at least one storage device and a data exchange port communicatively connected to a network. The process 1100 may be implemented as a set of instructions (e.g., an application) stored in the at least storage device. The processor of the charging pile may execute the set of instructions and, when executing the instructions, it may be configured to perform the process 1400. The operations of the illustrated process presented below are intended to be illustrative. In some embodiments, the process 1400 may be accomplished with one or more additional operations not described and/or without one or more of the operations discussed. Additionally, the order in which the operations of the process as illustrated in FIG. 14 and described below is not intended to be limiting. In some embodiments, process 1100 may further include operations 1410 to 1440.

In 1410, the processor (e.g., the receiving unit 1030) may obtain vehicle information of an electric vehicle that is connected to the charging pile 160 via a physical connection. The physical connection may include a wired connection (e.g., the charging line). In some embodiments, the electric vehicle may include a charging interface. The charging pile may be connected to the electric vehicle via the charging interface. In some embodiments, the processor may obtain the vehicle information via the charging interface. In some embodiments, the processor may establish a connection between the charging pile and the client terminal via the network (e.g., the network 120) when the processor detects the charging interface. Further the processor may obtain the vehicle information from the electric vehicle via the data exchange port communicatively connected to the network (e.g., the network 120). The vehicle information may be stored in a storage device implemented on the electric vehicle. The vehicle information of the electric vehicle may include the type of the electric vehicle, the brand of the electric vehicle, the license number of the electric vehicle, a current dump energy of the electric vehicle, the type of a charger of the electric vehicle, or the like.

In 1420, the processor (e.g., the sending unit 1020) may send a query instruction to a charging management device based on the vehicle information. The query instruction may be used to obtain charging information corresponding to the vehicle information. The query instruction may include a charging request and/or an associating request as described elsewhere in the present disclosure. The charging request may include the vehicle information. The associating request may include information relating to the client terminal. The information relating to the client terminal may include identification information of the client terminal, such as the MAC address of the client terminal, the IMEI of the client terminal, the Pseudo-Unique ID, the Android ID, or the like, or a combination thereof.

In 1430, the processor (e.g., the receiving unit 1030) may receive charging information corresponding to the vehicle information and a charging signal. The charging management device may estimate and/or search the charging information based on the vehicle information. The charging information may include one or more reference charging parameters such as reference charging duration, reference charging voltage, reference charging current, reference charging volume, etc., as described elsewhere in the present disclosure. For example, the charging management device may determine the reference charging current based on the type of the electric vehicle. As another example, the charging management device may estimate a reference charging duration or volume based on the current dump energy of the electric vehicle. The charging management device may transmit the charging information to the charging pile.

The charging signal may be a confirmation for starting to charge the electric vehicle from the client terminal. In some embodiments, the charging management device may generate a control instruction for starting the charging pile. The charging management device may transmit the control instruction for starting the charging pile to the client terminal. The client terminal may display the control instruction to the user and generate the charging signal upon receiving a confirmation for starting the charging pile form the user.

In 1440, the processor (e.g., the determining unit 1010) may operate the charging pile to charge the electric vehicle based on the charging information. In some embodiments, after the processor receives the charging information from the charging management device, the processor may start the charging pile to charge the electric vehicle. In some embodiments, after the processor receives the charging information from the charging management device, the processor may generate a prompt for starting to charge the electric vehicle. In some embodiments, the prompt for starting to charge the electric vehicle may be displayed on a user interface of the charging pile. In some embodiments, the prompt for starting to charge the electric vehicle may be transmitted to the client terminal for displaying to the user. In some embodiments, the processor may start the charging pile to charge the electric vehicle upon receiving a confirmation for the prompt for starting to charge the electric vehicle from the user. In some embodiments, the user may start the charging pile manually after receiving the prompt for starting to charge the electric vehicle.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, process 1400 may further include determining information relating to the client terminal and determining the client terminal associated with the electric vehicle based on the information relating to the client terminal.

Figure 15:
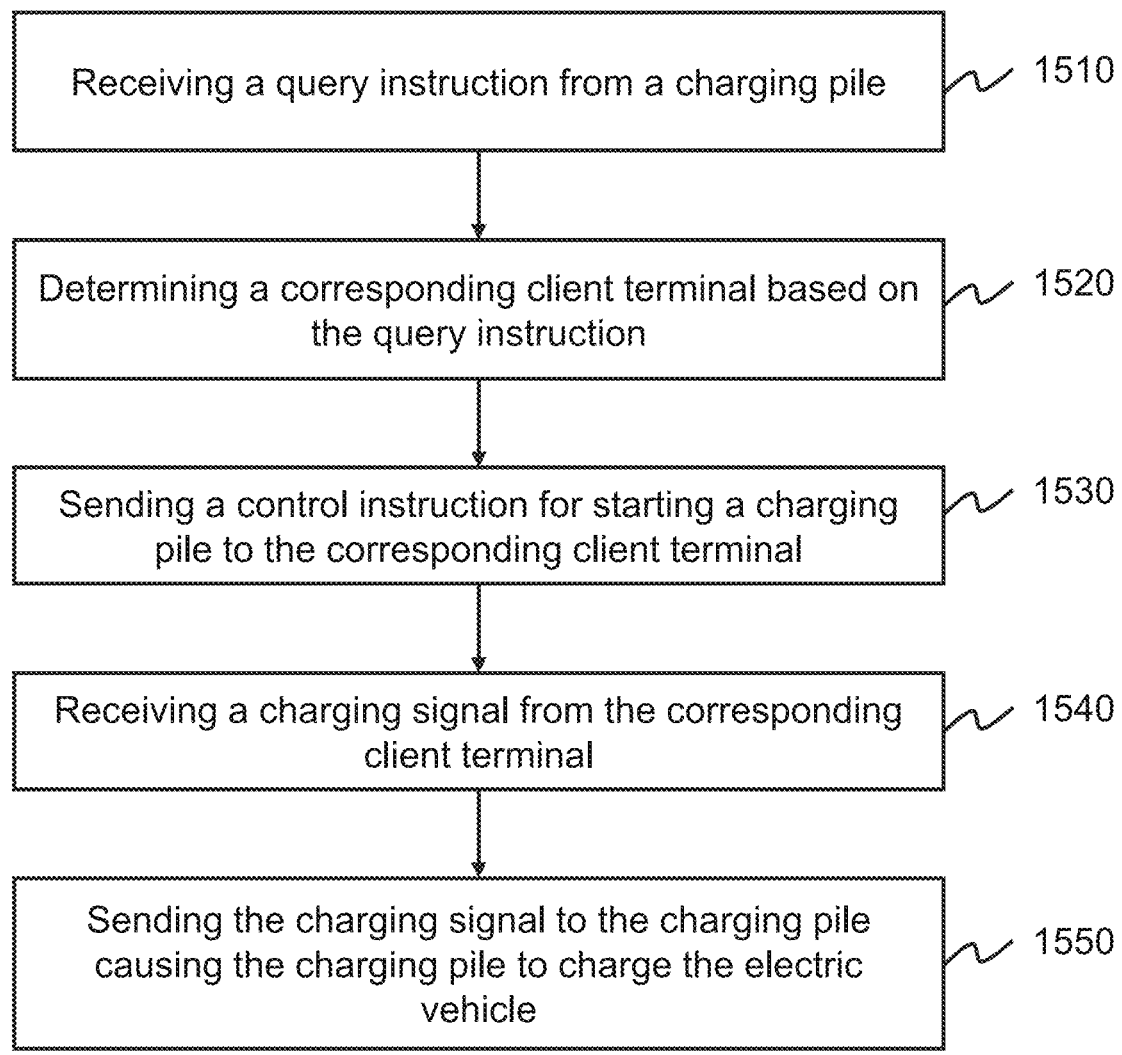
FIG. 15 is a flowchart illustrating an exemplary process for charging an electric vehicle according to some embodiments of the present disclosure.

FIG. 15 is a flowchart illustrating an exemplary process 1500 for charging an electric vehicle 140 according to some embodiments of the present disclosure. The process 1500 may be executed by the online to offline service system 100. For example, the process 1500 may be implemented on a processing device (e.g., the charging management device 420) having a processor, at least one storage device and a data exchange port communicatively connected to a network. The process 1500 may be implemented as a set of instructions (e.g., an application) stored in the storage device 150. The charging management device 420 may execute the set of instructions and, when executing the instructions, it may be configured to perform the process 1500. The operations of the illustrated process presented below are intended to be illustrative. In some embodiments, the process 1500 may be accomplished with one or more additional operations not described and/or without one or more of the operations discussed. Additionally, the order in which the operations of the process as illustrated in FIG. 15 and described below is not intended to be limiting. In some embodiments, process 900 may further include operations 1510 to 1550.

In 1510, the charging management device 420 (e.g., the receiving unit 810) may receive a query instruction from a charging pile 160. The query instruction may include a charging request and/or an associating request as described elsewhere in the present disclosure. The charging request may include the vehicle information for charging an electric vehicle. The associating request may include information relating to the client terminal for connecting the charging management device 420 with a client terminal associated with the electric vehicle. The information relating to the client terminal may include identification information of the client terminal, such as the MAC address of the client terminal, the IMEI of the client terminal, the Pseudo-Unique ID, the Android ID, or the like, or a combination thereof.

In 1520, the charging management device 420 (e.g., the determining unit 820) may determine a corresponding client terminal based on the query instruction. In some embodiments, the charging management device 420 (e.g., the determining unit 820) may determine the corresponding client terminal based on the associating request. Further, the charging management device 420 (e.g., the determining unit 820) may determine the corresponding client terminal based on the information relating to the client terminal. In some embodiments, the charging management device 420 may establish a connection between the charging management device 420 and the corresponding client terminal via a network (e.g., the network 120).

In 1530, the charging management device 420 (e.g., the sending unit 840) may send a control instruction for starting a charging pile to the corresponding client terminal. In some embodiments, the charging management device 420 may send the control instruction to the corresponding client terminal via the data exchange port communicatively connected to the network (e.g., the network 120).

In 1540, the charging management device 420 (e.g., the receiving unit 810) may receive a charging signal from the corresponding client terminal. The corresponding client terminal may display the control instruction to the user and generate the charging signal upon receiving a confirmation for starting the charging pile form the user.

In 1550, the charging management device 420 (e.g., the sending unit 840) may send the charging signal to the charging pile causing the charging pile to charge the electric vehicle 140. After the charging pile receives the charging signal, the charging pile may start to charge the electric vehicle. In some embodiments, the charging management device 420 may generate charging information for charging the electric vehicle. The charging pile may charge the electric vehicle based on the charging information.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 16:
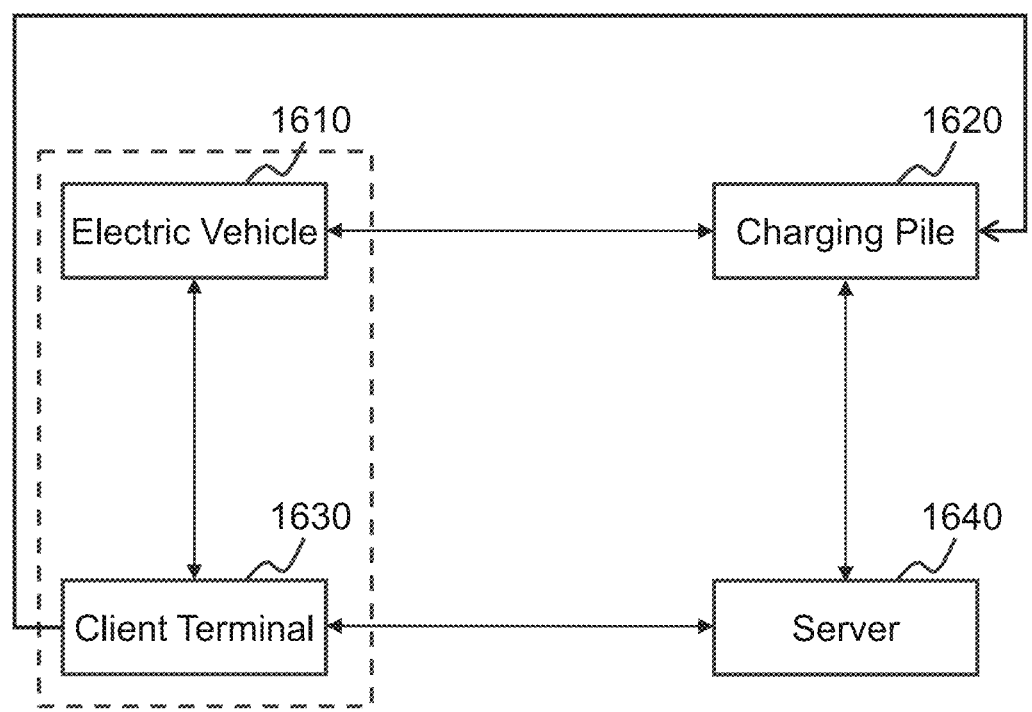
FIG. 16 shows a schematic diagram illustrating a charging process according to some embodiments of the present disclosure.

FIG. 16 shows a schematic diagram illustrating a charging process 1600 according to some embodiments of the present disclosure. As shown in FIG. 16, a user may connect a client terminal 1630 with an electric vehicle 1610 via a network (e.g., the network 120). Associating information relating to the election vehicle 1610 and the client terminal 1620 may be generated. The associating information may include vehicle information relating to the electric vehicle 1610 and information relating to the corresponding client terminal 1620. When the electric vehicle 1610 is physically connected to a charging pile 1620 via a charging interface implemented on the electric vehicle 1610, the charging pile 1620 may transmit an associating request for connecting a server 1640 and the client terminal 1630 and a charging request for charging the electric vehicle 1610 to the server 1640. Then the server 1640 may generate charging information based on the charging request and send the charging information to the charging pile 1620. The charging pile 1620 may charge the electric vehicle 1610 based on the charging information. In some embodiments, the server 1640 may receive current charging status of the electric vehicle 1610 from the charging pile 1620. The server 1640 may determine a charging fee based on the charging information and/or the current charging status. The server 1640 may transmit the received current charging status and/or the charging fee to the client terminal 1630. The server 1640 may deduct the charging fee from an electric bank account associated with the client terminal 1630. In some embodiments, the user may input a stop charging instruction via the client terminal 1630 to the charging pile 1620 and/or the server 1640. The charging pile 1620 may stop to charge the electric vehicle 1610 in response to the stop charging instruction.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method implemented on one or more computing devices for charging an electric vehicle, each of the one or more computing devices having at least one processor, at least one storage device and a data exchange port communicatively connected to a network, the one or more computing devices including at least one of a first computing device for charging station recommendation or a second computing device for charging control, the method comprising:
   receiving, by the first computing device, a request for charging station recommendation from a client terminal;
   determining, by the first computing device, at least one charging station within a preset distance range of the client terminal;
   determining, by the first computing device, an evaluation for each of the at least one charging station based on one or more evaluation parameters, wherein the one or more evaluation parameters include at least one of:
   a price discount provided by the each of the at least one charging station, a distance between the each of the at least one charging station and the client terminal, a preset recommendation value for the each of the at least one charging station, or a historical evaluation of the each of the at least one charging station;
   transmitting, by the first computing device, the evaluation of the each of the at least one charging station and an identifier of the each of the at least one charging station to the client terminal;
   receiving, by the second computing device, a charging request and an associating request for connecting the client terminal and the second computing device from a target charging pile at one of the at least one charging station;
   determining, by the second computing device, charging information for charging an electric vehicle associated with the client terminal based on the charging request;
   establishing, by the second computing device, a connection between the second computing device and the client terminal based on the associating request;
   sending, by the second computing device, the charging information to the target charging pile for charging the electric vehicle based on the charging information; and
   sending, by the second computing device, a charging signal to the target charging pile causing the target charging pile to charge the electric vehicle.

2. The method of claim 1, wherein the determining, by the first computing device, an evaluation for each of the at least one charging station includes:
   obtaining one or more preset weight values corresponding to the one or more evaluation parameters, respectively;
   estimating a weighted sum of the one or more evaluation parameters based on the one or more preset weight values; and
   designating the weighted sum of the one or more evaluation parameters as the evaluation of the each of the at least one charging station.

3. The method of claim 2, wherein the one or more preset weight values include at least one of:
   a first preset weight value corresponding to the price discount provided by the each of the at least one charging station being 40%,
   a second preset weight value corresponding to the distance between the each of the at least one charging station and the client terminal being 35%,
   a third preset weight value corresponding to the preset recommendation value of the each of the at least one charging station being 20%, or
   the fourth preset weight value corresponding to the historical evaluation value of the each of the at least one charging station being 5%.

4. The method of claim 1, further comprising:
   for each of the at least one charging station,
   determining, by the first computing device, the preset recommendation value based on one or more recommendation parameters, wherein the one or more recommendation parameters include at least one of:
   a number of charging piles at the each of the at least one charging station,
   a real-time parking fee at the each of the at least one charging station, or
   a unit charging price associated with the each of the at least one charging station.

5. The method of claim 4, wherein the determining the preset recommendation value includes:
   obtaining one or more preset percentages corresponding to one of the one or more recommendation parameters, respectively; and
   determining the preset recommendation value based on the one or more preset percentages, wherein the preset recommendation value is equal to a sum of the one or more recommendation parameters multiplying the corresponding preset percentage, respectively.

6. The method of claim 5, wherein the one or more preset percentages include at least one of:
   a first preset percentage corresponding to the number of charging piles at the each of the charging station being 45%,
   a second preset percentage corresponding to the real-time parking fee at the each of the at least one charging station being 35%, or
   a third preset percentage corresponding to the charging unit price associated with the each of the at least one charging station being 20%.

7. The method of claim 1, wherein the transmitting the evaluation of each of the at least one charging station and an identifier of each of the at least one charging station to the client terminal includes:
sorting the at least one charging station in a descending order according to the evaluation of the at least one charging station; and
sending the evaluation of each of the sorted at least one charging station and the identifier of each of the sorted at least one charging station to the client terminal for display.

8. The method of claim 1, wherein the transmitting the evaluation of each of the at least one charging station and an identifier of each of the at least one charging station to the client terminal includes:
determining whether the evaluation of the each of the at least one charging station is greater than or equal to a preset threshold; and
sending the identifier of the each of the at least one charging station to the client terminal for display in response to a determination that the evaluation is greater than or equal to the preset threshold.

9. The method of claim 1, further comprising:
obtaining, by the second computing device, a current charging status of the electric vehicle from the target charging pile; and
sending, by the second computing device, the current charging status to the client terminal through the connection between the client terminal and the second computing device.

10. The method of claim 1, further comprising:
determining, by the second computing device, whether the charging for the electric vehicle is completed;
in response to a determination that the charging for the electric vehicle is completed, determining, by the second computing device, a charging fee corresponding to the charging information;
sending, by the second computing device, the charging fee to the client terminal; and
deducting, by the second computing device, the charging fee from an electronic financial account associated with the client terminal upon receiving a payment confirmation for the charging fee from the client terminal.

11. A method for charging control of an electric vehicle implemented on a charging management device having at least one processor, at least one storage device and a data exchange port communicatively connected to a network, the method comprising:
receiving, by the at least one processor, a charging request and an associating request for connecting a client terminal and the charging management device from a charging pile;
determining, by the at least one processor, charging information for charging an electric vehicle associated with the client terminal based on the charging request;
establishing, by the at least one processor, a connection between the charging management device and the client terminal based on the associating request;
sending, by the at least one processor, the charging information to the charging pile for charging the electric vehicle based on the charging information; and
sending, by the at least one processor, a charging signal to the charging pile causing the charging pile to charge the electric vehicle.

12. The method of claim 11, further comprising:
obtaining, by the at least one processor, a current charging status of the electric vehicle from the target charging pile; and
sending, by the at least one processor, the current charging status to the client terminal through the connection between the client terminal and the charging management device.

13. The method of claim 11, further comprising:
determining, by the at least one processor, whether the charging for the electric vehicle is completed;
in response to a determination that the charging for the electric vehicle is completed, determining, by the at least one processor, a charging fee corresponding to the charging information;
sending, by the at least one processor, the charging fee to the client terminal; and
deducting, by the at least one processor, the charging fee from an electronic financial account associated with the client terminal upon receiving a payment confirmation for the charging fee from the client terminal.

14. A system for charging an electric vehicle, comprising:
at least one non-transitory storage medium including a set of instructions; and
one or more processors in communication with the at least one non-transitory storage medium, wherein when executing the set of instructions, the one or more processors are is directed to:
receive a request for charging station recommendation from a client terminal;
determine at least one charging station within a preset distance range of the client terminal;
determine an evaluation for each of the at least one charging station based on one or more evaluation parameters, wherein the one or more evaluation parameters include at least one of:
a price discount provided by the each of the at least one charging station, a distance between the each of the at least one charging station and the client terminal, a preset recommendation value for the each of the at least one charging station, or a historical evaluation of the each of the at least one charging station;
transmit the evaluation of the each of the at least one charging station and an identifier of the each of the at least one charging station to the client terminal;
receive a charging request and an associating request for connecting the client terminal and the system from a target charging pile at one of the at least one charging station;
determine charging information for charging an electric vehicle associated with the client terminal based on the charging request;
establish a connection between the system and the client terminal based on the associating request;
send the charging information to the target charging pile for charging the electric vehicle based on the charging information; and
send a charging signal to the target charging pile causing the target charging pile to charge the electric vehicle.

15. The system of claim 14, wherein the determining an evaluation for each of the at least one charging station includes:
obtaining one or more preset weight values corresponding to the one or more evaluation parameters, respectively;
estimating a weighted sum of the one or more evaluation parameters based on the one or more preset weight values; and designating the weighted sum of the one or more evaluation parameters as the evaluation of the each of the at least one charging station.

16. The system of claim 14, wherein the one or more processors is further directed to:
for each of the at least one charging station,
determine the preset recommendation value based on one or more recommendation parameters, wherein the one or more recommendation parameters include at least one of:
a number of charging piles at the each of the at least one charging station,
a real-time parking fee at the each of the at least one charging station, or
a unit charging price associated with the each of the at least one charging station.

17. The system of claim 14, wherein the transmitting the evaluation of each of the at least one charging station and an identifier of each of the at least one charging station to the client terminal includes:
determining whether the evaluation of the each of the at least one charging station is greater than or equal to a preset threshold; and
sending the identifier of the each of the at least one charging station to the client terminal for display in response to a determination that the evaluation is greater than or equal to the preset threshold.

18. The system of claim 14, wherein the one or more processors are further directed to:
determine whether the charging for the electric vehicle is completed;
in response to a determination that the charging for the electric vehicle is completed, determine a charging fee corresponding to the charging information;
send the charging fee to the client terminal; and
deduct the charging fee from an electronic financial account associated with the client terminal upon receiving a payment confirmation for the charging fee from the client terminal.

\* \* \* \* \*